United States Patent
Peterson et al.

(10) Patent No.: US 9,004,768 B1
(45) Date of Patent: Apr. 14, 2015

(54) COOLING-ENHANCED BEARING ASSEMBLIES, APPARATUSES, AND MOTOR ASSEMBLIES USING THE SAME

(71) Applicant: US Synthetic Corporation, Orem, UT (US)

(72) Inventors: S. Barrett Peterson, Orem, UT (US); Timothy N. Sexton, Bettendorf, IA (US)

(73) Assignee: US Synthetic Corporation, Orem, UT (US)

( * ) Notice: Subject to any disclaimer, the term of this patent is extended or adjusted under 35 U.S.C. 154(b) by 0 days.

(21) Appl. No.: 14/509,760

(22) Filed: Oct. 8, 2014

Related U.S. Application Data

(63) Continuation of application No. 14/164,696, filed on Jan. 27, 2014, now Pat. No. 8,888,371, which is a continuation of application No. 13/410,514, filed on Mar. 2, 2012, now Pat. No. 8,672,550.

(60) Provisional application No. 61/525,443, filed on Aug. 19, 2011.

(51) Int. Cl.
  *F16C 3/14* (2006.01)
  *F16C 3/16* (2006.01)
  *F16C 37/00* (2006.01)
  *F16C 17/04* (2006.01)

(52) U.S. Cl.
  CPC ............... *F16C 37/00* (2013.01); *F16C 17/04* (2013.01)

(58) Field of Classification Search
  CPC .............................. F16C 33/043; F16C 37/00
  USPC .......... 384/305–309, 313, 316, 317, 900, 903
  See application file for complete search history.

(56) References Cited

U.S. PATENT DOCUMENTS

| | | | |
|---|---|---|---|
| 4,789,251 A | 12/1988 | McPherson et al. |
| 5,253,939 A | 10/1993 | Hall |
| 5,482,380 A | 1/1996 | Corratti et al. |
| 5,498,081 A | 3/1996 | Dennis et al. |
| 5,879,085 A | 3/1999 | Ball et al. |
| 6,132,094 A | 10/2000 | Cornelison et al. |
| 7,255,480 B2 | 8/2007 | John et al. |
| 7,552,782 B1 | 6/2009 | Sexton et al. |
| 7,866,418 B2 | 1/2011 | Bertagnolli et al. |

(Continued)

FOREIGN PATENT DOCUMENTS

WO   WO 2009/015338   1/2009

OTHER PUBLICATIONS

U.S. Appl. No. 61/525,443, filed Aug. 19, 2011, Peterson et al.

(Continued)

*Primary Examiner* — Phillip A Johnson
(74) *Attorney, Agent, or Firm* — Dorsey & Whitney LLP

(57) ABSTRACT

Cooling-enhanced bearing assemblies, apparatuses, and motor assemblies using the same are disclosed. In an embodiment, a bearing assembly may include a plurality of superhard bearing elements distributed circumferentially about an axis. Each of the superhard bearing elements may have a bearing surface. The bearing assembly may further include a support ring that carries the plurality of superhard bearing elements. The support ring may include at least an upper surface, an inner surface, and an outer surface. A plurality of cooling features may be arranged on at least one of the upper surface, the inner surface, or the outer surface of the support ring.

26 Claims, 24 Drawing Sheets

(56) References Cited

U.S. PATENT DOCUMENTS

| | | |
|---|---|---|
| 7,998,573 B2 | 8/2011 | Qian et al. |
| 8,034,136 B2 | 10/2011 | Sani et al. |
| 8,236,074 B1 | 8/2012 | Bertagnolli et al. |
| 8,480,304 B1 | 7/2013 | Cooley et al. |
| 8,672,550 B1 | 3/2014 | Peterson et al. |
| 2002/0141670 A1 | 10/2002 | Nicholas |
| 2004/0190804 A1 | 9/2004 | John et al. |
| 2006/0140524 A1* | 6/2006 | John et al. ............ 384/420 |
| 2009/0097788 A1 | 4/2009 | Cooley et al. |
| 2010/0084196 A1 | 4/2010 | Bertagnolli et al. |
| 2010/0218995 A1 | 9/2010 | Sexton et al. |
| 2011/0174544 A1 | 7/2011 | Scott et al. |
| 2012/0039551 A1 | 2/2012 | Cooley et al. |
| 2012/0080230 A1 | 4/2012 | Flores et al. |

OTHER PUBLICATIONS

U.S. Appl. No. 13/213,382, filed Aug. 19, 2011, Cooley et al.
U.S. Appl. No. 13/550,821, filed Jul. 17, 2012, Peterson et al.
U.S. Appl. No. 14/164,696, filed Jan. 27, 2014, Peterson et al.
U.S. Appl. No. 13/410,514, May 20, 2013, Office Action.
U.S. Appl. No. 13/410,514, Aug. 27, 2013, Notice of Allowance.
U.S. Appl. No. 13/410,514, Oct. 29, 2013, Notice of Allowance.
U.S. Appl. No. 13/410,514, Feb. 26, 2014, Issue Notification.
U.S. Appl. No. 13/550,821, Aug. 26, 2013, Office Action.
U.S. Appl. No. 13/550,821, Oct. 24, 2013, Office Action.
U.S. Appl. No. 13/550,821, Feb. 14, 2014, Office Action.
U.S. Appl. No. 13/550,821, May 29, 2014, Office Action.
U.S. Appl. No. 13/550,821, Jul. 31, 2014, Office Action.
U.S. Appl. No. 14/164,696, Jul. 8, 2014, Notice of Allowance.
U.S. Appl. No. 13/550,821, mailed Nov. 20, 2014, Office Action.

\* cited by examiner

COOLING-ENHANCED BEARING ASSEMBLIES, APPARATUSES, AND MOTOR ASSEMBLIES USING THE SAME

CROSS-REFERENCE TO RELATED APPLICATIONS

This application is a continuation of U.S. application Ser. No. 14/164,696 filed on 27 Jan. 2014, which is a continuation of U.S. application Ser. No. 13/410,514 filed on 2 Mar. 2012 (now U.S. Pat. No. 8,672,550 issued on 18 Mar. 2014), which claims the benefit of U.S. Provisional Application No. 61/525,443, filed on 19 Aug. 2011, the disclosure of each of the foregoing applications is incorporated herein, in its entirety, by this reference.

BACKGROUND

Subterranean drilling systems that employ downhole drilling motors are commonly used for drilling boreholes in the earth for oil and gas exploration and production. A subterranean drilling system typically includes a downhole drilling motor that is operably connected to an output shaft. A pair of thrust-bearing apparatuses also can be operably coupled to the downhole drilling motor. A rotary drill bit configured to engage a subterranean formation and drill a borehole is connected to the output shaft. As the borehole is drilled with the rotary drill bit, pipe sections may be connected to the subterranean drilling system to form a drill string capable of progressively drilling the borehole to a greater depth within the earth.

Each thrust-bearing apparatus includes a stator that does not rotate relative to the motor housing and a rotor that is attached to the output shaft and rotates with the output shaft. The stator and rotor each includes a plurality of bearing elements that may be fabricated from polycrystalline diamond compacts ("PDCs") that provide diamond bearing surfaces that bear against each other during use.

In operation, high-pressure drilling fluid may be circulated through the drill string and power section of the downhole drilling motor, usually prior to the rotary drill bit engaging the bottom of the borehole, to generate torque and rotate the output shaft and the rotary drill bit attached to the output shaft. When the rotary drill bit engages the bottom of the borehole, a thrust load is generated, which is commonly referred to as "on-bottom thrust" that tends to compress and is carried, at least in part, by one of the thrust-bearing apparatuses. Fluid flow through the power section may cause what is commonly referred to as "off-bottom thrust," which is carried, at least in part, by the other thrust-bearing apparatus. The on-bottom and off-bottom thrust carried by the thrust-bearing apparatuses can be extremely large.

The drilling fluid used to generate the torque for rotating the rotary drill bit exits openings formed in the rotary drill bit and returns to the surface, carrying cuttings of the subterranean formation through an annular space between the drilled borehole and the subterranean drilling system. Typically, a portion of the drilling fluid is diverted by the downhole drilling motor to cool and lubricate the bearing elements of the thrust-bearing apparatuses. Insufficient heat removal may cause premature damage to the thrust-bearing apparatuses.

The operational lifetime of the thrust-bearing apparatuses often can determine the useful life of the subterranean drilling system.

SUMMARY

Various embodiments of the invention relate to bearing assemblies, apparatuses and motor assemblies that include cooling features configured to improve heat removal from the bearing assemblies and/or lubrication of superhard bearing elements thereof. In an embodiment, a bearing assembly may include a plurality of superhard bearing elements distributed circumferentially about an axis. Each of the superhard bearing elements may have a bearing surface. The bearing assembly may further include a support ring that carries the plurality of superhard bearing elements. The support ring may include at least an upper surface, an inner surface, and an outer surface. A plurality of cooling features may be arranged on at least one of the upper surface, the inner surface, or the outer surface of the support ring.

In an embodiment, the cooling features may comprise at least one of a plurality of fins, a plurality of grooves, or a plurality of baffles. The cooling features may also be configured to increase cooling of the support ring in contact with lubricating fluid during operation of the bearing assembly. The cooling features may also be configured to direct lubricating fluid around the support ring or the plurality of superhard bearing elements during operation of the bearing assembly. In an embodiment, at least some of the cooling features may be distributed about the axis in a TOW.

In an embodiment, a bearing apparatus includes two bearing assemblies. At least one of the two bearing assemblies may be configured as any of the disclosed bearing assembly embodiments that include a support ring having cooling features configured to influence cooling of the support ring or the plurality of superhard bearing elements.

In an embodiment, a method for manufacturing a bearing assembly may include forming one or more cooling features on a support ring including at least an inner surface, an outer surface, and an upper surface. The method may further include securing a plurality of superhard bearing elements to the support ring. In an embodiment, forming the one or more cooling features may include at least one of grinding, machining, laser-cutting, or electro-discharge machining the one or more cooling features in at least one of the upper surface, the inner surface, or the outer surface of the support ring. In another embodiment, forming the one or more cooling features may include at least one of brazing, welding, or fastening the one or more cooling features to at least one of the upper surface, the inner surface or the outer surface of the support ring.

Other embodiments include downhole motors for use in drilling systems and subterranean drilling systems that may utilize any of the disclosed bearing apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments, wherein identical reference numerals refer to identical or similar elements or features in different views or embodiments shown in the drawings.

DETAILED DESCRIPTION

Figure 1A:
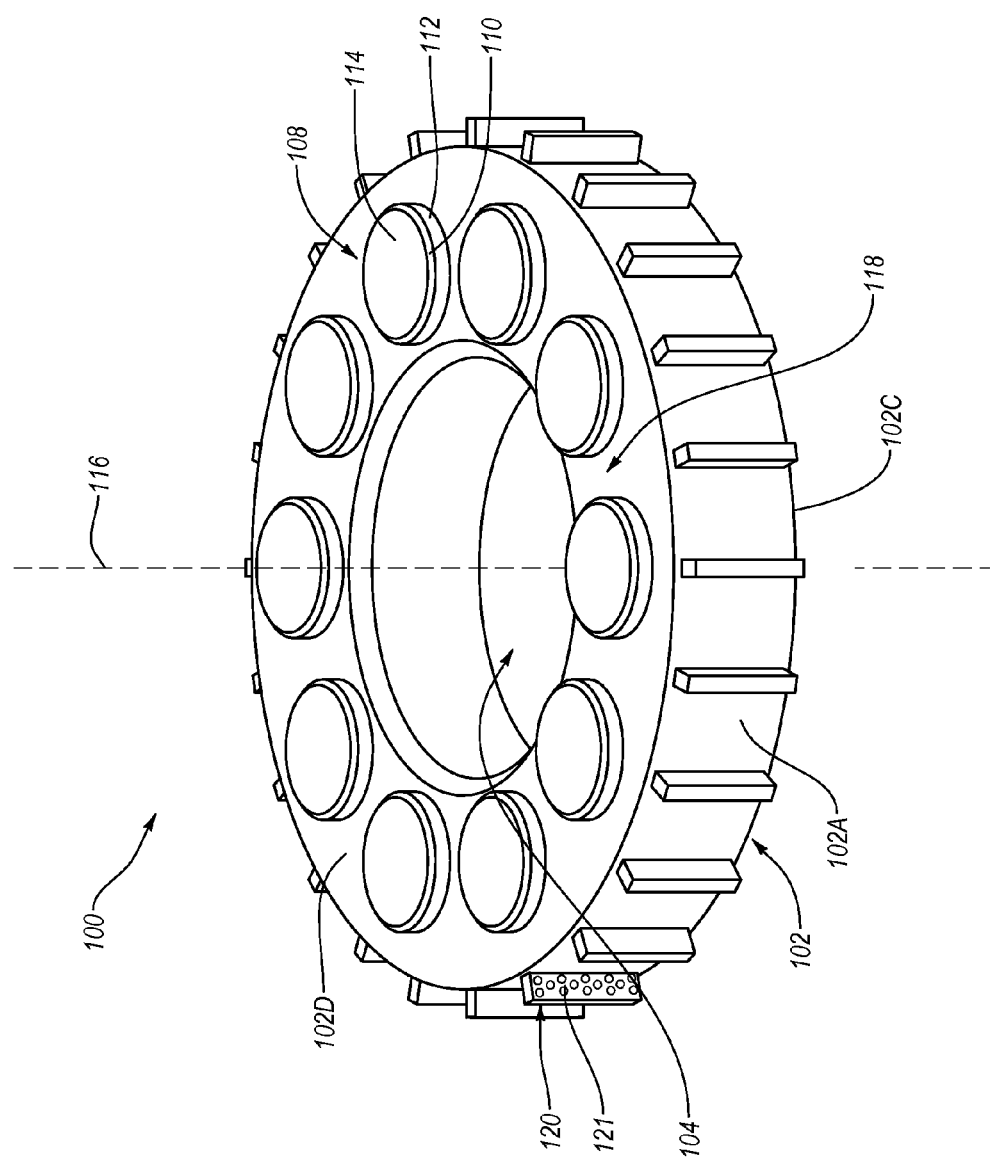
FIG. 1A is an isometric view of a thrust-bearing assembly according to an embodiment.
Figure 1B:
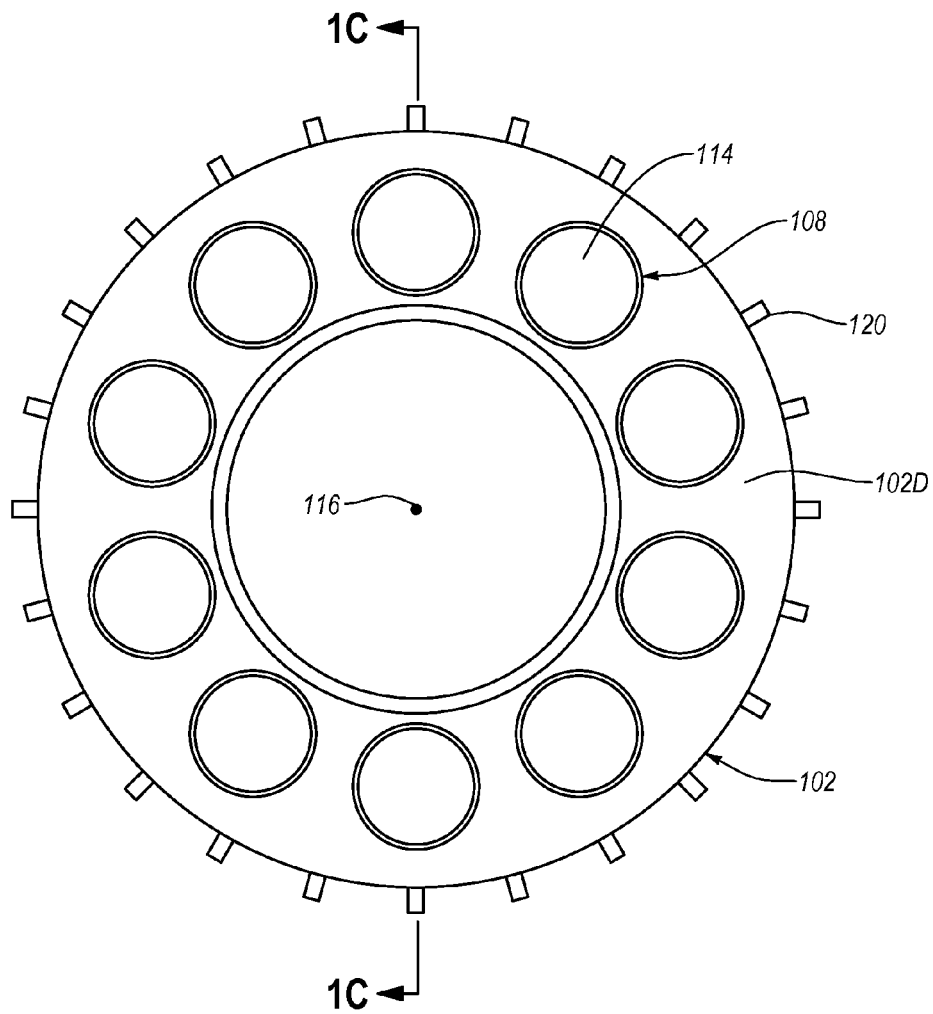
FIG. 1B is a top plan view of the thrust-bearing assembly shown in FIG. 1A.
Figure 1C:
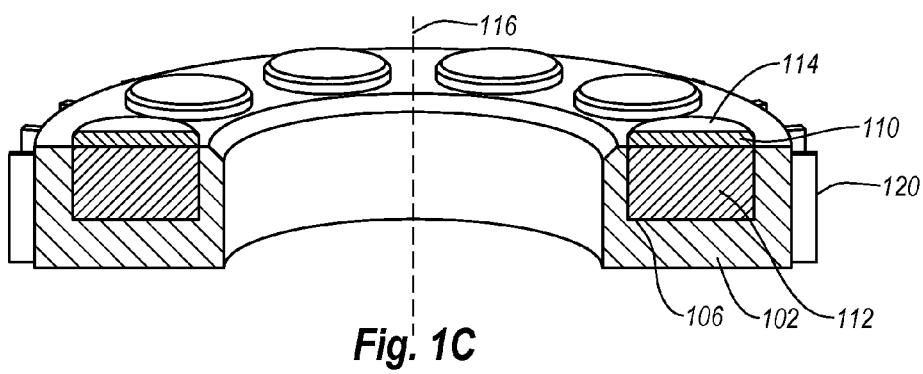
FIG. 1C is an isometric cutaway view taken along line 1C-1C of the thrust-bearing assembly shown in FIG. 1B.

Embodiments of the invention relate to bearing assemblies, apparatuses, and motor assemblies that include cooling features configured to improve heat removal from the bearing assemblies and/or lubrication of superhard bearing elements thereof. FIGS. 1A-1C are isometric, top plan, and isometric cutaway views of a thrust-bearing assembly 100 according to an embodiment.

The thrust-bearing assembly 100 may form a stator or a rotor of a thrust-bearing apparatus used in a subterranean drilling system. In the illustrated embodiment, a support ring 102 is substantially cylindrical and defines an opening 104 through which a shaft (not shown) of, for example, a downhole drilling motor may extend. The support ring 102 may be generally circular and made from a variety of different materials. For example, the support ring 102 may comprise carbon steel, stainless steel, tungsten carbide, or any other suitable metal, alloy, or conductive or non-conductive material. The support ring 102 may also include a plurality of recesses 106 (FIG. 1C) formed therein.

The thrust-bearing assembly 100 further may include a plurality of generally cylindrical superhard bearing elements 108. The superhard bearing elements 108 may include a substrate 112, a superhard table 110 bonded to the substrate 112, and a bearing surface 114. The superhard bearing elements 108 are illustrated being distributed circumferentially about a thrust axis 116 along with a thrust force that may be generally directed during use. As shown in FIGS. 1A and 1B, gaps 118 may be located between adjacent ones of the superhard bearing elements 108. In an embodiment, at least one of, some of, or all of the gaps 118 may exhibit a minimum width of about 0.00020 inches to 0.100 inches, such as about 0.00040 inches to 0.0010 inches, or about 0.00040 inches to 0.080 inches. In other embodiments, the gaps 118 may exhibit minimum widths that are relatively larger or smaller.

Each of the superhard bearing elements 108 may be partially disposed in a corresponding one of the recesses 106 (shown in FIG. 1C) of the support ring 102 and secured partially therein via brazing, press-fitting, threadly attaching, fastening with a fastener, combinations of the foregoing, or another suitable technique. As used herein, a "superhard bearing element" is a bearing element including a bearing surface that is made from a material exhibiting a hardness that is at least as hard as tungsten carbide.

In any of the embodiments disclosed herein, the superhard bearing elements 108 may be made from a number of different superhard materials, such as polycrystalline diamond, polycrystalline cubic boron nitride, silicon carbide, tungsten carbide, or any combination of the foregoing superhard materials. For example, the superhard table 110 (FIG. 1C) may be formed from polycrystalline diamond and the substrate 112 (FIG. 1C) may be formed from cobalt-cemented tungsten carbide. Furthermore, in any of the embodiments disclosed herein, the polycrystalline diamond table may be leached to at least partially remove or substantially completely remove a metal-solvent catalyst (e.g., cobalt, iron, nickel, or alloys thereof) that was used to initially sinter precursor diamond particles to form the polycrystalline diamond. In another embodiment, an infiltrant used to re-infiltrate a preformed leached polycrystalline diamond table may be leached or otherwise removed to a selected depth from a bearing surface. Moreover, in any of the embodiments disclosed herein, the polycrystalline diamond may be un-leached and include a metal-solvent catalyst (e.g., cobalt, iron, nickel, or alloys thereof) that was used to initially sinter the precursor diamond particles that form the polycrystalline diamond and/or an infiltrant used to re-infiltrate a preformed leached polycrystalline diamond table. Examples of methods for fabricating the superhard bearing elements and superhard materials from which the superhard bearing elements can be made disclosed in U.S. Pat. Nos. 7,866,418 and 7,998,573; and co-pending U.S. patent application Ser. Nos. 11/545,929 and 11/983,619, the disclosure of each of the foregoing patents and applications is incorporated herein, in its entirety, by this reference.

The diamond particles that may be used to fabricate the superhard table 110 in a high-pressure/high-temperature process ("HPHT") may exhibit a larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the diamond particles may include a portion exhibiting a relatively larger size (e.g., 30 μm, 20 μm, 15 μm, 12 μm, 10 μm, 8 μm) and another portion exhibiting at least one relatively smaller size (e.g., 6 μm, 5 μm, 4 μm, 3 μm, 2 μm, 1 μm, 0.5 μm, less than 0.5 μm, 0.1 μm, less than 0.1 μm). In an embodiment, the diamond particles may include a portion exhibiting a relatively larger size between about 10 μm and about 40 μm and another portion exhibiting a relatively smaller size between about 1 μm and 4 μm. In some embodiments, the diamond particles may comprise three or more different sizes (e.g., one relatively larger size and two or more relatively smaller sizes), without limitation.

Additionally, in any of the embodiments disclosed herein, the superhard bearing elements 108 may be free-standing (e.g., substrateless) and formed from a polycrystalline diamond body that is at least partially or fully leached to remove a metal-solvent catalyst initially used to sinter the polycrystalline diamond body.

The superhard bearing elements 108 may be machined to tolerances and mounted in the support ring 102 and/or attached to the support ring 102. The bearing surfaces 114 may be planarized (e.g., by lapping and/or grinding) and/or positioned so that the bearing surfaces 114 are substantially coplanar. Optionally, one or more of the superhard bearing elements 108 may exhibit a peripherally extending edge chamfer. However, in other embodiments, the peripherally extending edge chamfer may be omitted.

As illustrated in FIGS. 1A-1C, the thrust-bearing assembly 100 may include cooling features configured to improve heat removal and/or lubrication of the thrust-bearing assembly 100. For example, the cooling features may be configured to increase flow of lubricating fluid over and/or around the support ring 102 and/or the superhard bearing elements 108. In other embodiments, the cooling features may be configured to improve heat removal from the support ring 102 and/or the superhard bearing elements 108 during operation of the thrust-bearing assembly 100.

In an embodiment, the cooling features may be configured as a plurality of fins 120 extending radially from the support ring 102. For example, the fins 120 may be attached to an outer surface 102A of the support ring 102. The fins 120 may be configured and positioned to increase the velocity of lubricating fluid over the top and/or around the support ring 102 and/or the superhard bearing elements 108. The fins 120 may also be configured and positioned to help capture more of the lubricating fluid flowing about the bearing assembly 100 to utilize the heat capacity of the lubricating fluid. The fins 120 may further be configured to mix the lubricating fluid to help break-up solids having the potential to interfere with the flow of the lubricating fluid through the thrust-bearing assembly 100.

Often the lubricating fluid for a thrust-bearing assembly in a subterranean drilling application is referred to as "drilling mud," which is also the fluid used to remove cuttings from the borehole as a drill bit drills a subterranean formation.

The fins 120 may be formed in any suitable manner, and no particular method for forming the fins 120 is to be considered limiting. For example, the fins 120 may be formed of carbon steel, stainless steel, tungsten carbide, ceramic materials (e.g., cemented carbides), composites, combinations thereof, or other suitably abrasion resistant material. In other embodiments, the fins 120 may be formed integrally with the support ring 102. In other embodiments, the fins 120 may be secured to the support ring 102 via brazing, welding, fastening with one or more fasteners, or any other suitable technique. In other embodiments, the fins 120 may be secured to the support ring 102 such that the lubricating fluid may flow over, under, through, around the fins 120, or combinations thereof.

As illustrated, the fins 120 may be circumferentially distributed about the thrust axis 116, with each fin 120 being positioned on the outer surface 102A of the support ring 102 and substantially extending between a bottom surface 102C and an upper surface 102D of the support ring 102. One or more of the fins 120 may be configured as straight fins 120 having a generally rectangular geometric shape extending along a substantially straight path that is substantially parallel to the thrust-axis 116. In an embodiment, one or more of the fins 120 may extend only part way between the bottom surface 102C and the upper surface 102D of the support ring 102. In yet other embodiments, the fins 120 may be distributed about the thrust axis 116, with two or more fins 120 grouped together, with the fins 120 irregularly distributed about the thrust axis 116, or in a variety of other configurations.

Figure 2A:
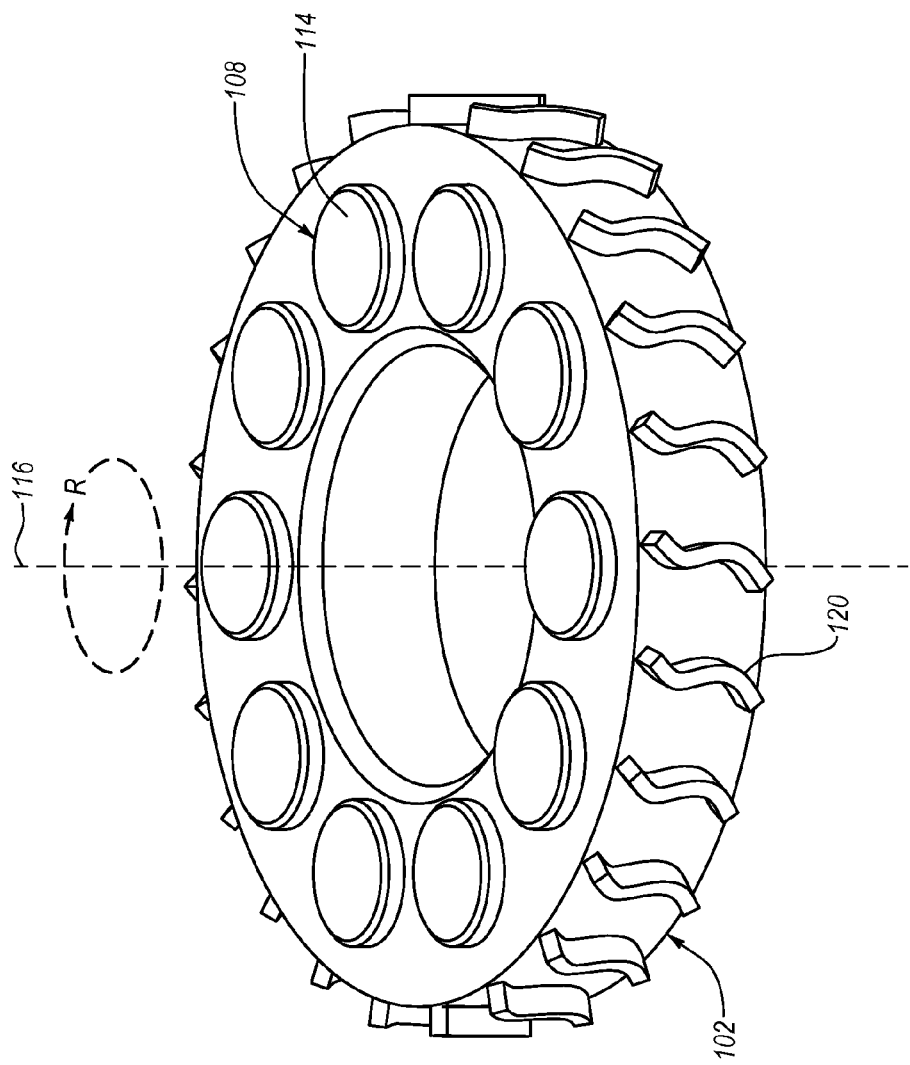
FIG. 2A is an isometric view of a thrust-bearing assembly according to an embodiment.

The fins 120 may exhibit any of a variety of configurations. For example, one or more of the fins 120 may have a generally rectangular shape, an arcuate shape, a generally crescent shape, a generally s-like shape (as shown in FIG. 2A), a generally u-like shape, a generally v-like shape, combinations thereof, or any other suitable shape. In other embodiments, one or more of the fins 120 may include surface features configured to direct the flow of the lubricating fluid in a desired manner (e.g., over the top and/or around the support ring 102 and/or the superhard bearing elements 108). In an embodiment, one or more of the fins 120 may include portions that are rounded, flat, curved, sinusoidal, twisted, combinations thereof, or other suitable configurations. In other embodiments, the fins 120 may include flow features 121 configured to influence fluid flow. For example, the fins 120 may include channels, nubs, slots, through holes, divots, ridges, notches, or other suitable flow features.

In an embodiment, one or more of the fins 120 may include edge features configured to modify (e.g., increase) fluid flow. For example, one or more of the fins 120 may include edges that are rounded, flat, curved, combinations thereof, or other suitable edge features. In other embodiments, the fins 120 may include edges that are sharpened, notched, irregularly shaped, combinations thereof, or the like. Such a configuration may allow the fins 120 to partially agitate, break-up or create a desired flow characteristic in the lubricating fluid.

Figure 2B:
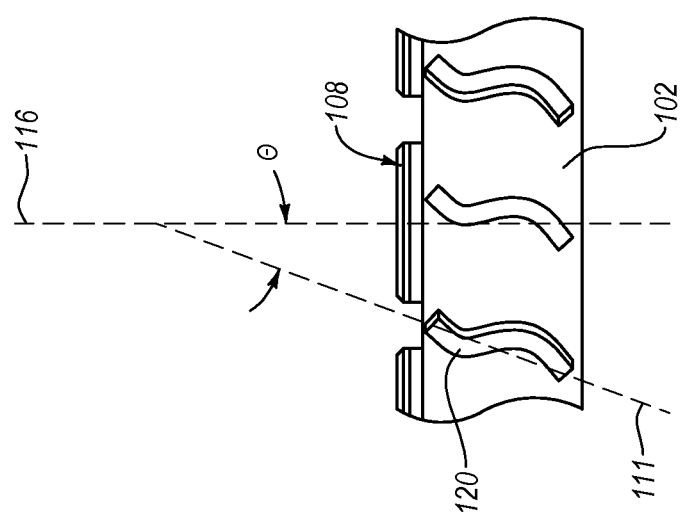
FIG. 2B is a partial side view of the thrust-bearing assembly shown in FIG. 2A.

The fins 120 on the support ring 102 may also be adapted to have any of a variety of orientations. For example, in an embodiment, one or more of the fins 120 may be configured as oblique fins substantially extending along a reference path 111 that forms an oblique angle θ relative to the thrust-axis 116 as shown in FIG. 2B. The angle θ may be configured to help impel the lubricating fluid flowing around the support ring 102 and/or direct fluid flow over and/or around the support ring 102 and/or the superhard bearing elements 108. In an embodiment, the angle θ may be about one (1) degree to eighty nine (89) degrees; about five (5) degrees to eighty five (85) degrees; or about twenty (20) degrees to seventy (70) degrees. In other embodiments, the angle θ may be relatively larger or smaller. The one or more of the fins 120 may be oriented toward a first rotational direction R of the support ring 102 about the axis 116 (i.e., as shown in FIG. 2A). When the support ring 102 rotates in the direction R, the fins 120 may direct and/or impel lubricating fluid flowing around the support ring 102 over and/or around the superhard bearing elements 108. In other embodiments, one or more of the fins 120 may be oriented toward a second rotational direction of the support ring 102. The second rotational direction may be generally opposite the first rotational direction. In yet other embodiments, some of the fins 120 may be oriented in the first rotational direction and other fins 120 may be oriented in the second rotational direction. Such a configuration may allow the fins 120 to help impel and/or direct lubricating fluid in the first rotational direction R, the second rotational direction, or another desired direction. Accordingly, wear on the superhard bearing elements 108 may be reduced with selected, directional lubrication. In yet other embodiments, the support ring 102 may include both straight fins 120 and oblique fins 120. For example, the support ring 102 may include a pair of straight fins 120 followed by a pair of oblique fins 120, followed by another pair of straight fins 120.

Figure 3:
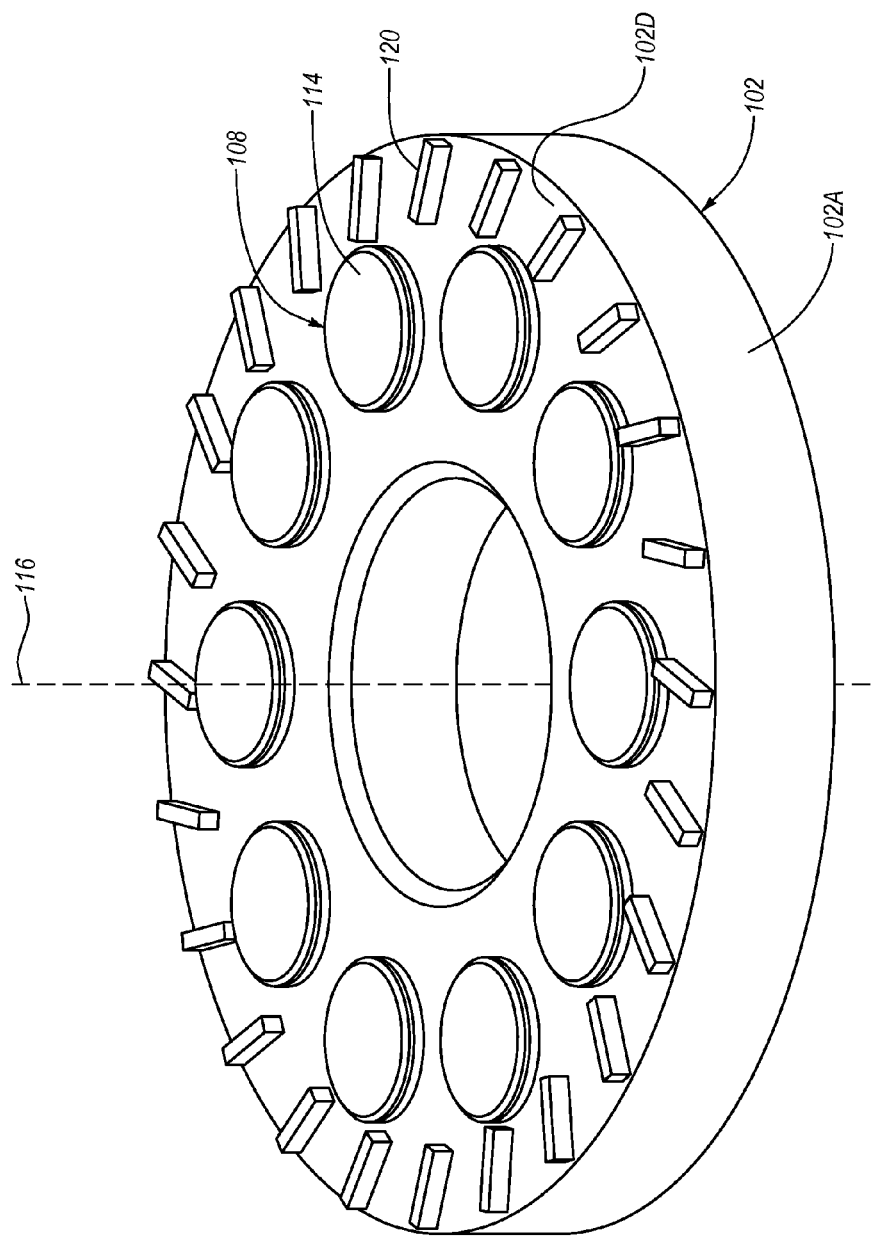
FIG. 3 is an isometric view of a thrust-bearing assembly according to an embodiment.
Figure 4A:
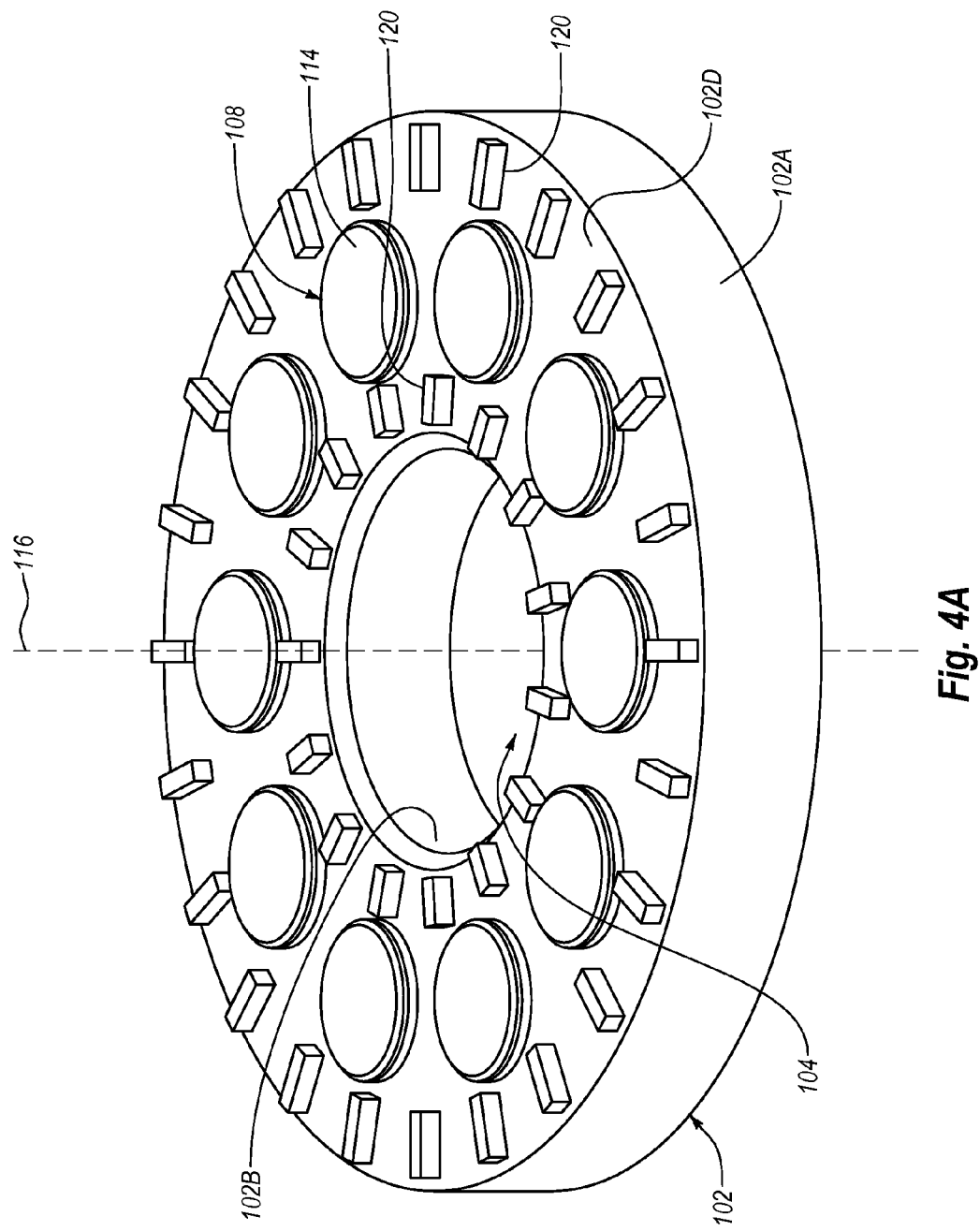
FIG. 4A is an isometric view of a thrust-bearing assembly according to an embodiment.

The position of the fins 120 on the support ring 102 may be also be adapted to have a variety of configurations. For example, the fins 120 may extend from upper surface 102D of the support ring 102. As shown in FIG. 3, at least some of the fins 120 may be circumferentially distributed about the thrust-axis 116 and positioned between the superhard bearing elements 108 and the outer surface 102A. Such a configuration may enable the fins 120 to direct the flow of lubricating fluid over and/or around the superhard bearing elements 108. While the fins 120 are shown as being distributed in single row about the thrust-axis, in other embodiments the fins 120 may be distributed in any number of rows or in other patterns or designs. For example, as shown in FIG. 4A, the fins 120 may be distributed on the upper surface 102D in a first row, between the superhard bearing elements 108 and the outer surface 102A, and a second row, between the central opening 104 or inner surface 102B and the superhard bearing elements 108. In yet other embodiments, at least some of the fins 120 may be distributed in a row between adjacent ones of the superhard bearing elements 108. Such a configuration may enable the fins 120 to direct lubricating fluid from both the outer surface 102A and the central opening 104 over the top and/or around the superhard bearing elements 108.

Figure 4B:
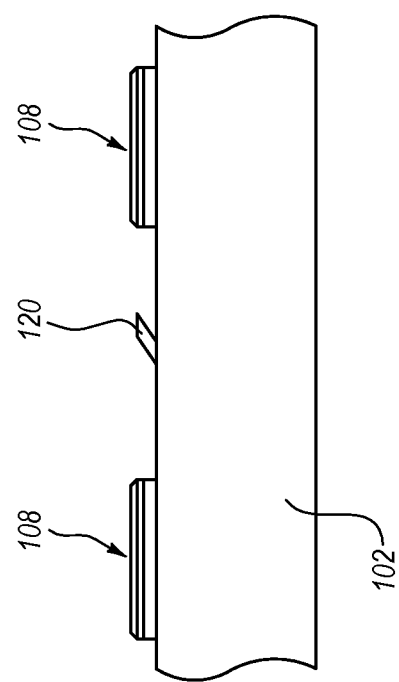
FIG. 4B is a partial side view of a thrust-bearing assembly according to an embodiment.

The tilt of the fins 120 relative to the upper surface 102D of the support ring 102 may also be adapted to have any of a variety of configurations. For example, as shown in FIG. 4B, at least a portion of the fins 120 may extend at an angle from the upper surface 102D of the support ring 102 toward the bearing surfaces 114 of the superhard bearing elements 108. Such a configuration may enhance flow of the lubricating fluid into and from stagnant flow areas between adjacent ones of the superhard bearing elements 108 (e.g., creating areas of high and low pressure during operation).

Figure 5:
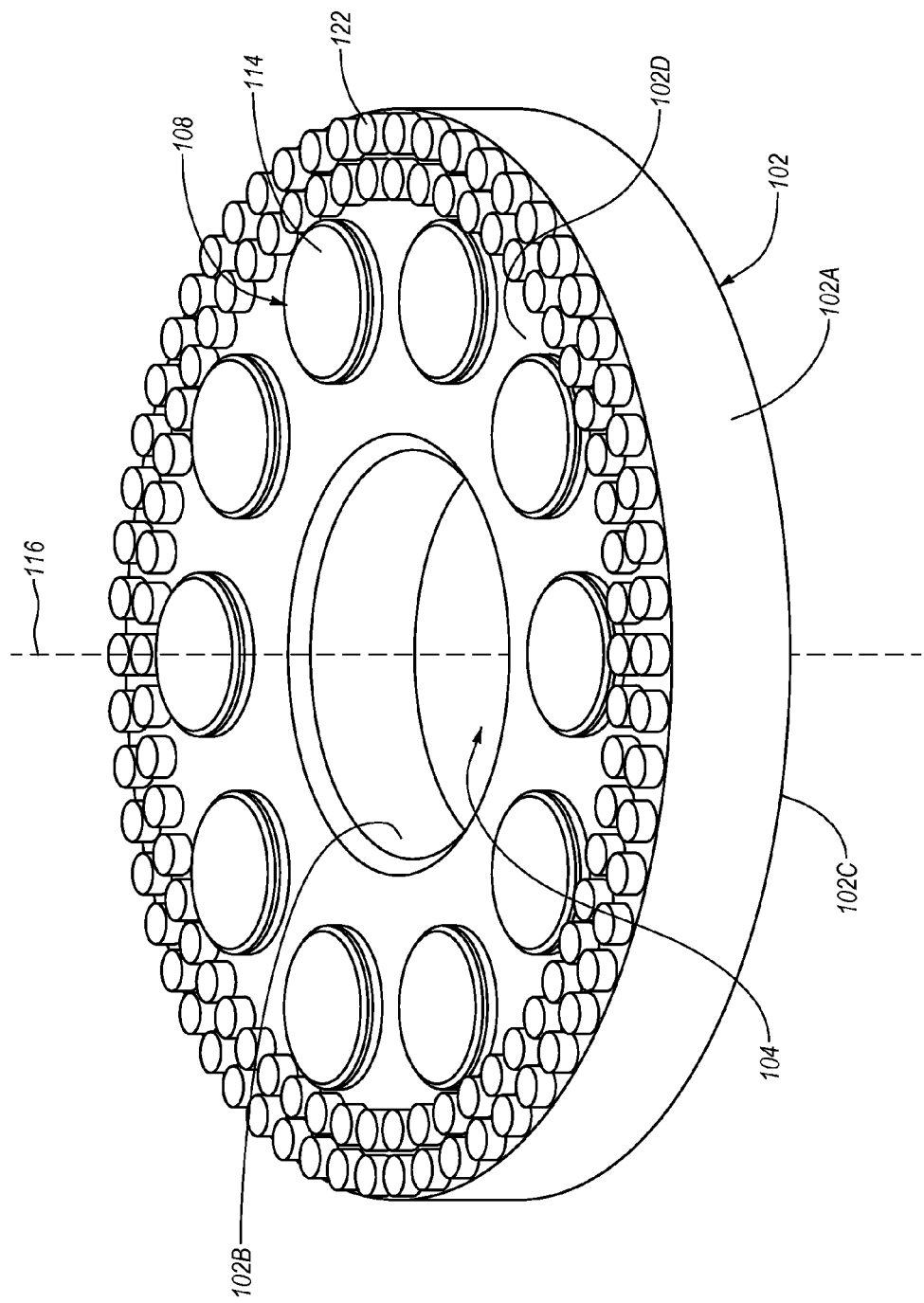
FIG. 5 is an isometric view of a thrust-bearing assembly according to an embodiment.

The cooling features may also be adapted to have any of a variety of configurations. For example, as illustrated in FIG. 5, the cooling features may be configured as a plurality of baffles 122. The baffles 122 may be configured and/or positioned on the support ring 102 to change the flow of the lubricating fluid and/or agitate the lubricating fluid. In addition, the baffles 122 may also effectively increase the surface area of the support ring 102 in contact with the lubricating fluid to improve heat dissipation. In an embodiment, the baffles 122 may include a generally cylindrical shaped body. In other embodiments, the baffles may embody a plate-like shaped body, a generally square shaped body, a generally diamond shaped body, a generally wedge shaped body, or any other suitable shaped body. Like the fins 120, the baffles 122 may also include flow features, surface features and/or edge features. For example, the baffles 122 may include channels, nubs, slots, divots, ridges, notches, combinations thereof, or other flow features configured to influence fluid flow.

In an embodiment, the baffles 122 may be distributed about the thrust-axis 116 on the upper surface 102D of the support ring 102 between the outer surface 102A and the superhard bearing elements 108. In other embodiments, the baffles 122 may be positioned on the upper surface 102D between the central opening 104 or inner surface 102B and the superhard bearing elements 108, the bottom surface 102C, the outer surface 102A, or combinations thereof. As illustrated in FIG. 5, the baffles 122 may be positioned such that gaps between the baffles 122 form multiple flow paths. Such a configuration may allow the baffles 122 to direct the lubricating fluid over and/or around the superhard bearing elements 108 and/or the support ring 102. The baffles 122 may also help create and/or reduce turbulent flow conditions, agitate, or break-up the lubricating fluid to increase heat removal from the thrust-bearing assembly 100. While the baffles 122 are shown having similar sizes and configurations, in other embodiments the baffles 122 may have sizes and/or configurations that vary. For example, the baffles 122 may include a first portion of baffles 122 having a generally cylindrically-shaped body and a second portion of baffles 122 having a generally wedge-shaped body. In other embodiments, the baffles 122 may include a gradient of baffle sizes having varying widths and/or heights.

Figure 6A:
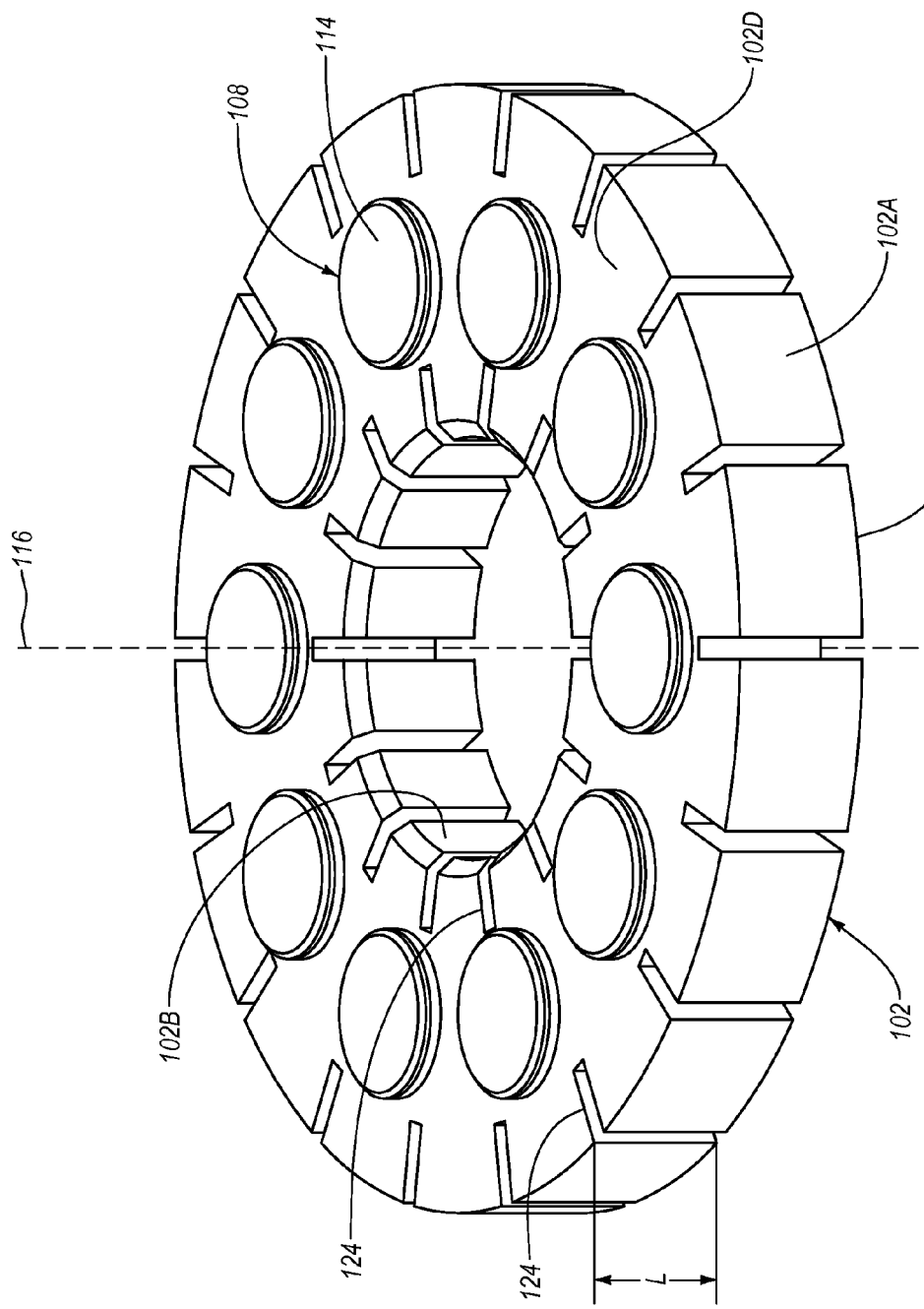
FIG. 6A is an isometric view of a thrust-bearing assembly according to an embodiment.
Figure 6B:
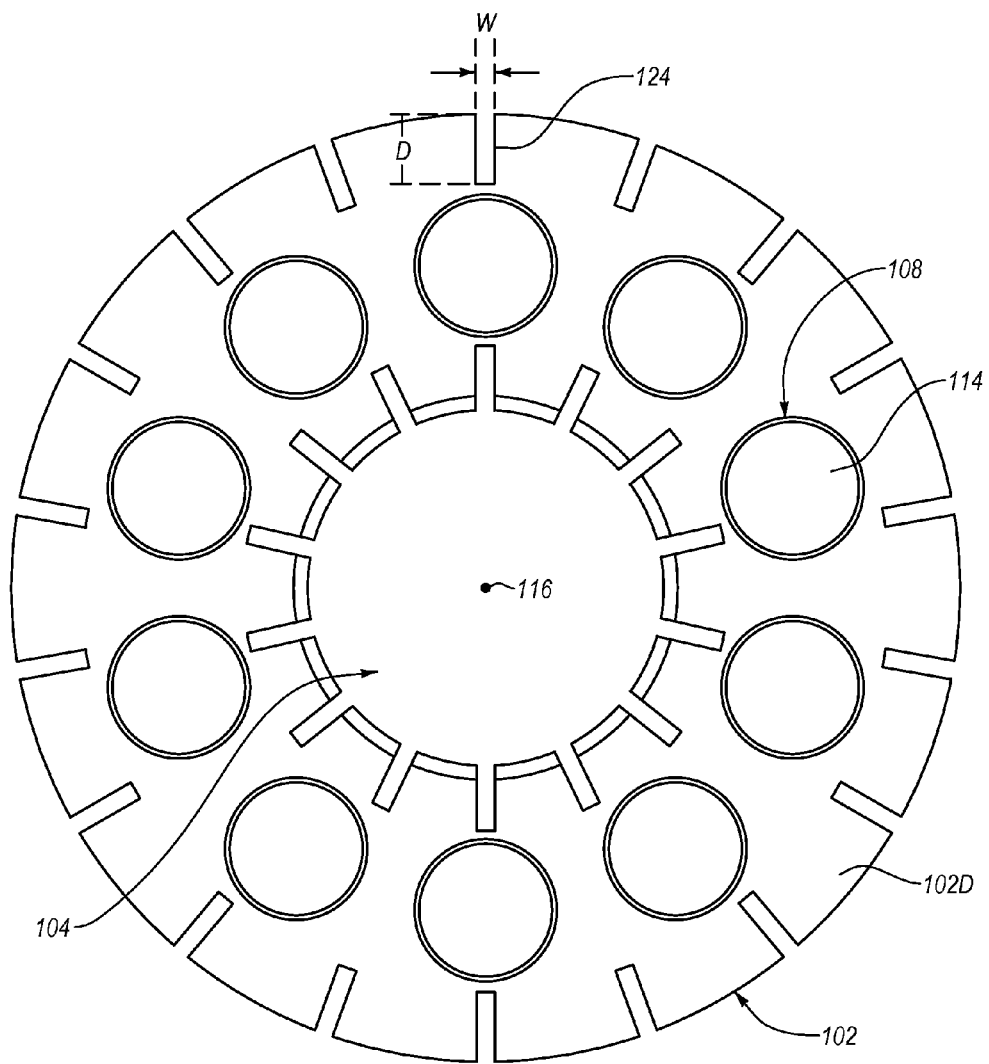
FIG. 6B is a top plan view of the thrust-bearing assembly shown in FIG. 6A.

The cooling features may also be configured as a plurality of grooves 124 formed in the support ring 102 as illustrated in FIGS. 6A and 6B. For example, the grooves 124 may be circumferentially distributed about the thrust-axis 116 on the outer surface 102A of the support ring 102. As shown, the grooves 124 may also be circumferentially distributed about the thrust-axis on the inner surface 102B of the support ring 102. The grooves 124 on the outer surface 102A may be substantially aligned or substantially unaligned with grooves 124 on the inner surface 102B. In other embodiments, the location of the grooves 124 may vary. For example, the grooves 124 may be positioned along the outer surface 102A, the inner surface 102B, the upper surface 102D, the bottom surface 102C, or combinations thereof. The grooves 124 may be formed in any suitable manner, and no particular method for forming the grooves 124 is to be considered limiting. For example, the grooves 124 may be formed by electro-discharge machining ("EDM"), laser-cutting, machining processes, casting, grinding, formed in situ in a powder metallurgy process, spark machining, or otherwise forming the grooves 124 in the support ring 102.

One or more of the grooves 124 may have a length L extending between the bottom surface 102C and the upper surface 102D of the support ring 102. In other embodiments, the length L of the grooves 124 may extend only part way between the bottom surface 102C and the upper surface 102D of the support ring 102. In yet other embodiments, the lengths L of the grooves 124 may vary from groove 124 to groove 124. Variations of the length of the grooves 124 may help the grooves 124 influence flow conditions and/or heat dissipation. For example, a groove 124 having a greater length L may expose more surface area of the support ring 102 to the lubricating fluid than a groove 124 having a shorter length L. In yet other embodiments, the grooves 124 may be distributed about the thrust-axis, with two or more grooves 124 grouped together, with the grooves 124 irregularly distributed about the thrust-axis 116, or in a variety of other configurations.

As illustrated, the grooves 124 may have a generally rectangular cross-section. In other embodiments, the grooves 124 may have a generally v-shaped cross-section, a generally u-shaped cross-section, a generally circular shaped cross-section, a generally parabolic shaped cross-section, a generally trapezoidal shaped cross-section, combinations thereof, or other suitable cross-sectional shapes. The cross-section of the grooves 124 may influence flow conditions and heat dissipation. For example, in an embodiment, at least one of the grooves 124 may have a portion including a v-shaped cross-section configured to improve cooling of the support ring 102 and/or bearing elements 108 and lubrication by increasing the fluid velocity of the lubricating fluid through that portion of the groove 124. In other embodiments, the grooves 124 may include a first deeper cross-sectional shape followed by a second shallower cross-sectional shape to direct the lubricating fluid over the top and/or around the support ring 102 and/or the superhard bearing elements 108. In yet other embodiments, the grooves 124 may include smooth and/or irregular surfaces to influence flow conditions. For example, at least a portion of the grooves 124 may include an irregular surface configured to improve heat dissipation by increasing turbulent flow of the lubricating fluid.

As illustrated in FIG. 6B, at least one of the grooves 124 may have a width W and a depth D. Variations of the depth D and/or the width W of the grooves 124 may help the grooves 124 influence flow conditions and/or heat dissipation. In an embodiment, the depth D of the grooves 124 may extend between the bottom portion of the grooves 124 and the outer surface 102A of the support ring 102. For example, the depth D may be about 0.1 inches to about 0.4 inches, such as about 0.15 inches to about 0.25 inches. As illustrated, the grooves 124 may have at least substantially the same depth D. However, in other embodiments, the grooves 124 may have at least substantially different depths D. In addition, the depths D of a groove 124 may vary along its path. For example, at least one of the grooves 124 may have a depth D that includes a deeper portion and a shallower portion.

The width W of the grooves 124 may extend between opposing sidewalls of the grooves 124. In an embodiment, the width of the grooves 124 may be about 0.1 inches to about 0.5 inches, such as about 0.2 inches to about 0.3 inches. In other embodiments, the widths W of the grooves 124 may be wider or narrower. As illustrated, the grooves 124 may have at least substantially the same width W. However, in other embodiments, some or all of the grooves 124 may have substantially different widths W. In addition, the widths W of the grooves 124 may vary. For example, at least one of the grooves 124 may have a width W that includes a narrower portion and a wider portion. Such a configuration may allow the grooves 124 to influence flow conditions.

In an embodiment, the relationship between the depth D of one or more of the grooves 124 and the width W of the one or more grooves 124 may be configured to influence flow conditions and/or heat dissipation. For example, the depth D of at least one of the grooves 124 may be at least: about fifty percent (50%); about one hundred percent (100%); about one hundred and fifty percent (150%); about two hundred percent (200%); or about three hundred percent (300%) of the width W of at least one of the grooves 124. In addition, the depth D of at least one of the grooves 124 may be about fifty percent (50%) to about one hundred and fifty percent (150%); or about one hundred percent (100%) of the width W of at least one of the grooves 124. In other configurations, the depth D of one or more of the grooves 124 and the width W of one or more of the grooves 124 may be larger or smaller relative to each other. Grooves 124 may be sized and configured such that the support ring 102 exhibits a "finned" structure. Such a finned structure may be advantageous for heat dissipation.

Figure 7A:
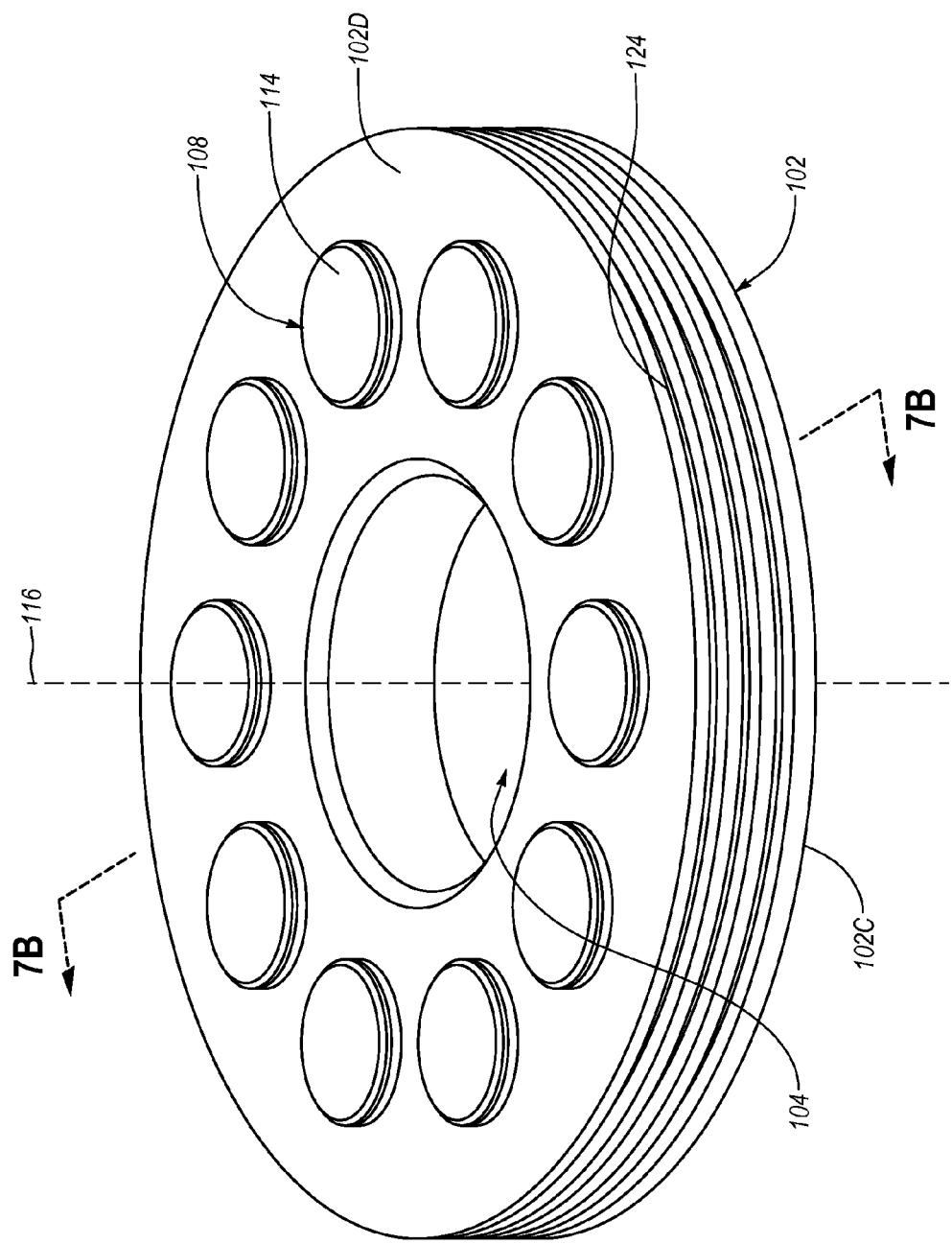
FIG. 7A is an isometric view of a thrust-bearing assembly according to an embodiment.
Figure 7B:
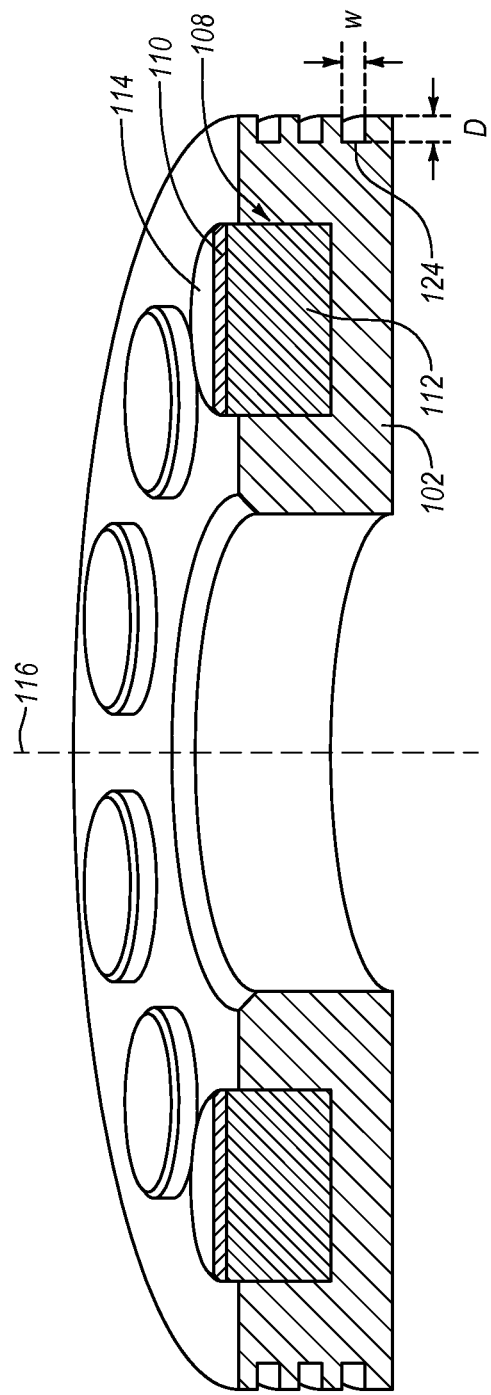
FIG. 7B is an isometric cutaway view taken along line 7B-7B of the thrust-bearing assembly shown in FIG. 7A.

In an embodiment, the grooves 124 may extend along a ring-like path about the thrust-axis 116 substantially parallel to the upper surface 102D and/or bottom surface 102C of the support ring 102 as shown in FIGS. 7A and 7B. In other embodiments, the grooves 124 may extend along an arcuate path, a sinusoidal path, an irregular path, combinations thereof, or other suitable path configurations. Variations of the depth D and/or the width W of the grooves 124 may help the grooves 124 influence flow conditions and/or heat dissipation. At least some of the grooves 124 may be generally parallel to one another or generally non-parallel to one another. The grooves 124 may be generally continuous or generally non-continuous. For example, one or more of the grooves 124 may extend at least partially about the thrust-axis 116 followed by a solid portion of the support ring 102 followed by another groove 124.

Figure 8:
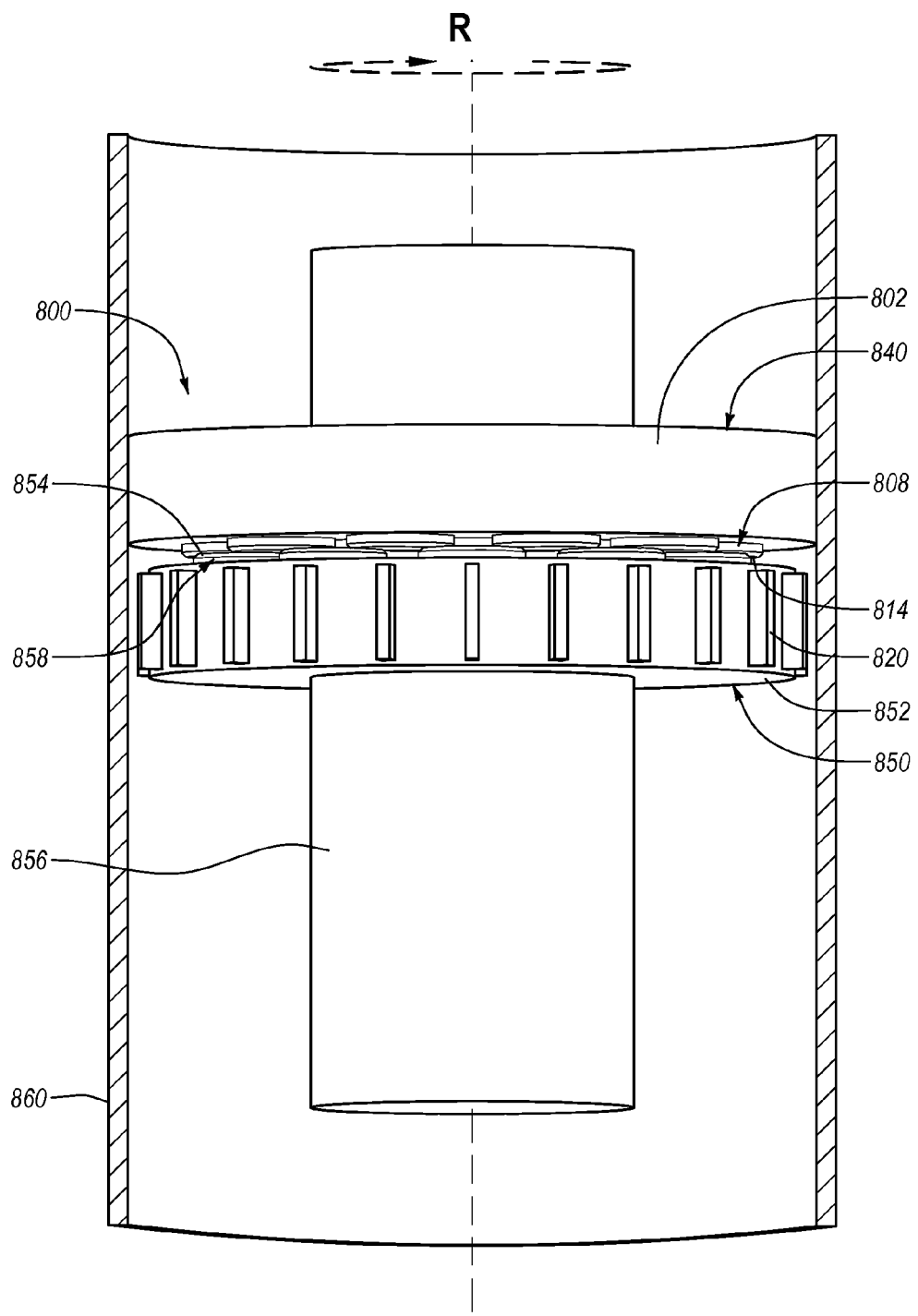
FIG. 8 is an isometric view of a thrust-bearing apparatus that may employ any of the disclosed thrust-bearing assemblies according to an embodiment.

Any of the above described thrust-bearing assembly embodiments may be employed in a thrust-bearing apparatus. FIG. 8 is an isometric view of a thrust-bearing apparatus 800. The thrust-bearing apparatus 800 may include a stator 840. The stator 840 may include a plurality of circumferentially-adjacent superhard bearing elements 808 mounted or otherwise attached to a support ring 802, with each of the superhard bearing elements 808 having a bearing surface 814. The thrust-bearing apparatus 800 further may include a rotor 850. The rotor 850 may include a support ring 852 and a plurality of superhard bearing elements 858 mounted or otherwise attached to the support ring 852, with each of the superhard bearing elements 858 having a bearing surface 854. In an embodiment, at least a portion of the rotor 850 may include at least one cooling feature 820 that may exhibit, for example, the configuration of the fins 120 or other cooling features disclosed herein. The cooling feature or fins 820 may be formed as a portion of the support ring 852 and/or may be mounted or otherwise attached to a support ring 852. As shown, a shaft 856 may be coupled to the support ring 852 and operably coupled to an apparatus capable of rotating the shaft 856 in a direction R (or in a generally opposite direction), such as a downhole motor. For example, the shaft 856 may extend through and may be secured to the support ring 852 of the rotor 850 by press-fitting or threadly coupling the shaft 856 to the support ring 852 or another suitable technique. A housing 860 may be secured to a support ring 802 of the stator 840 and may extend circumferentially about the shaft 856 and the rotor 850. In another embodiment, at least a portion of the stator 840, or both the rotor 850 and stator 840, may include at least one cooling feature.

In operation, the lubricating fluid (which may include, lubricating fluid, drilling fluid, or mud) may be pumped between the shaft 856 and the housing 860, and through the thrust-bearing apparatus 800. The fins 820 may be configured and positioned to direct and/or interact with the lubricating fluid, which in turn can reduce friction and/or increase heat dissipation. For example, the fins 820 may further be configured and positioned to direct the lubricating fluid over and/or around the support ring 802 and/or the superhard bearing elements 808. Moreover, the fins 820 may interact with the lubricating fluid flowing through the thrust-bearing apparatus 800 to enhance heat dissipation. In an embodiment, the fins 820 of the rotor 850 may include sharpened edges or slots to help break-up any solids or solidifying materials in the lubricating fluid. Such a configuration may help prevent the bearing apparatus 800 from clogging up. In addition, the fins 820 may include surface features, flow features, and/or edge features. For example, the fins 820 may include curved surfaces to help circulate the lubricating fluid through the thrust-bearing apparatus 800.

Under certain operational conditions the thrust-bearing apparatus 800 may be operated as a hydrodynamic bearing. For example, where the rotational speed of the rotor 850 is sufficient and the thrust load is sufficiently low, a fluid film may develop between the bearing surfaces 814 of the stator 840 and the bearing surfaces 854 of the rotor 850. The fins 820 on the rotor 850 may help develop and/or maintain the fluid film by directing the lubricating fluid toward the bearing surfaces 814, 854. The fluid film can have sufficient pressure to prevent contact between the respective bearing surfaces and, thus, reduce wear of the superhard bearing elements 858 and the superhard bearing elements 808. In such a situation, the thrust-bearing apparatus 800 may be described as operating hydrodynamically. When the thrust loads exceed a certain value and/or the rotational speed of the rotor 850 is reduced, the pressure of the fluid film may not be sufficient to prevent the bearing surfaces 814 of the stator 840 and the bearing surfaces 854 of the rotor 850 from contacting each other. Thus, the thrust-bearing apparatus 800 may be operated to improve lubrication of the contact area between the bearing surfaces 814 of the stator 840 and the bearing surfaces 854 of the rotor 850 or as a hydrodynamic bearing.

It is noted that in other embodiments, the rotor or stator may be configured as any of the previously described embodiments of thrust-bearing assemblies.

Figure 9A:
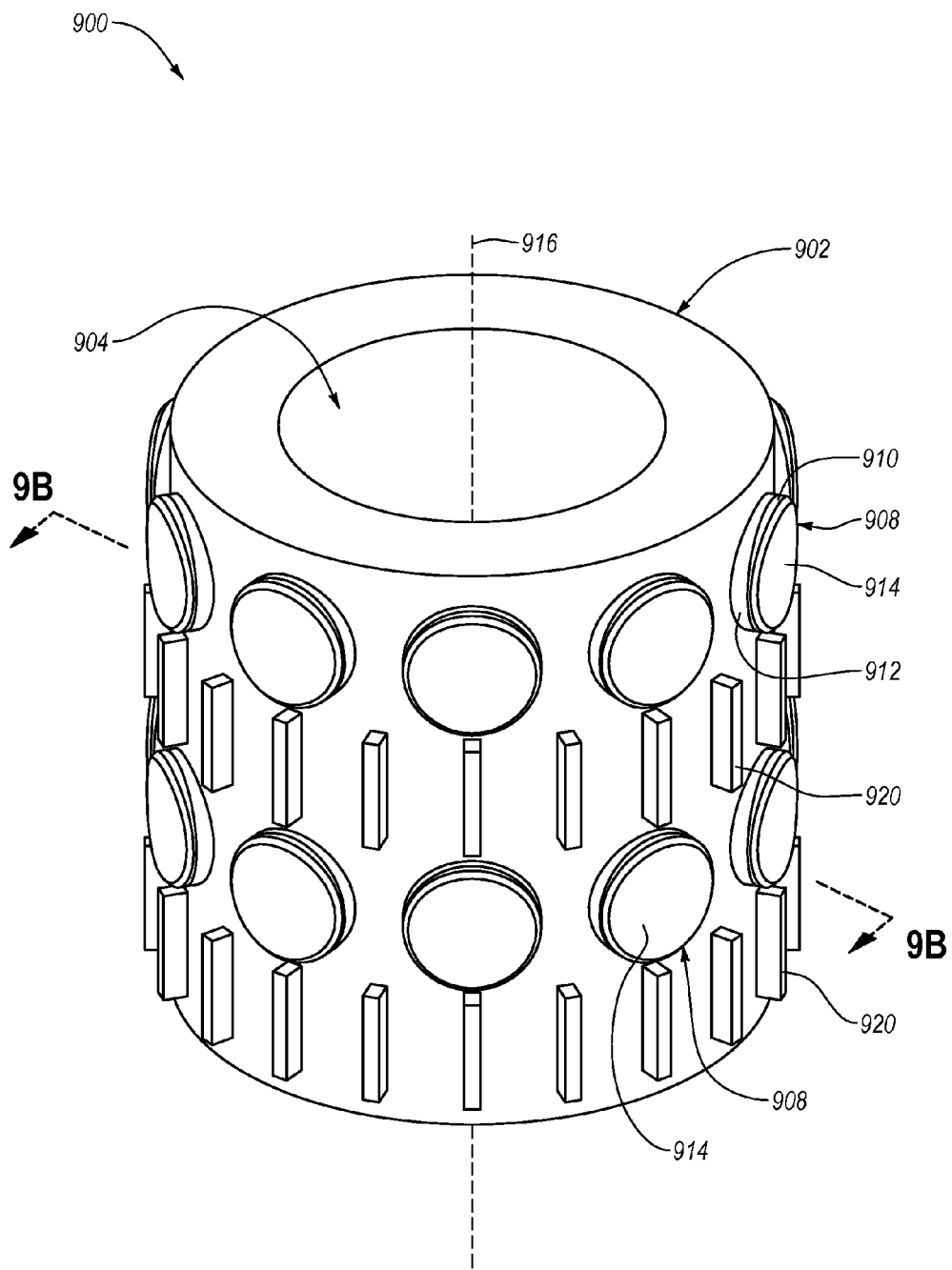
FIG. 9A is an isometric view of a radial bearing assembly according to an embodiment.
Figure 9B:
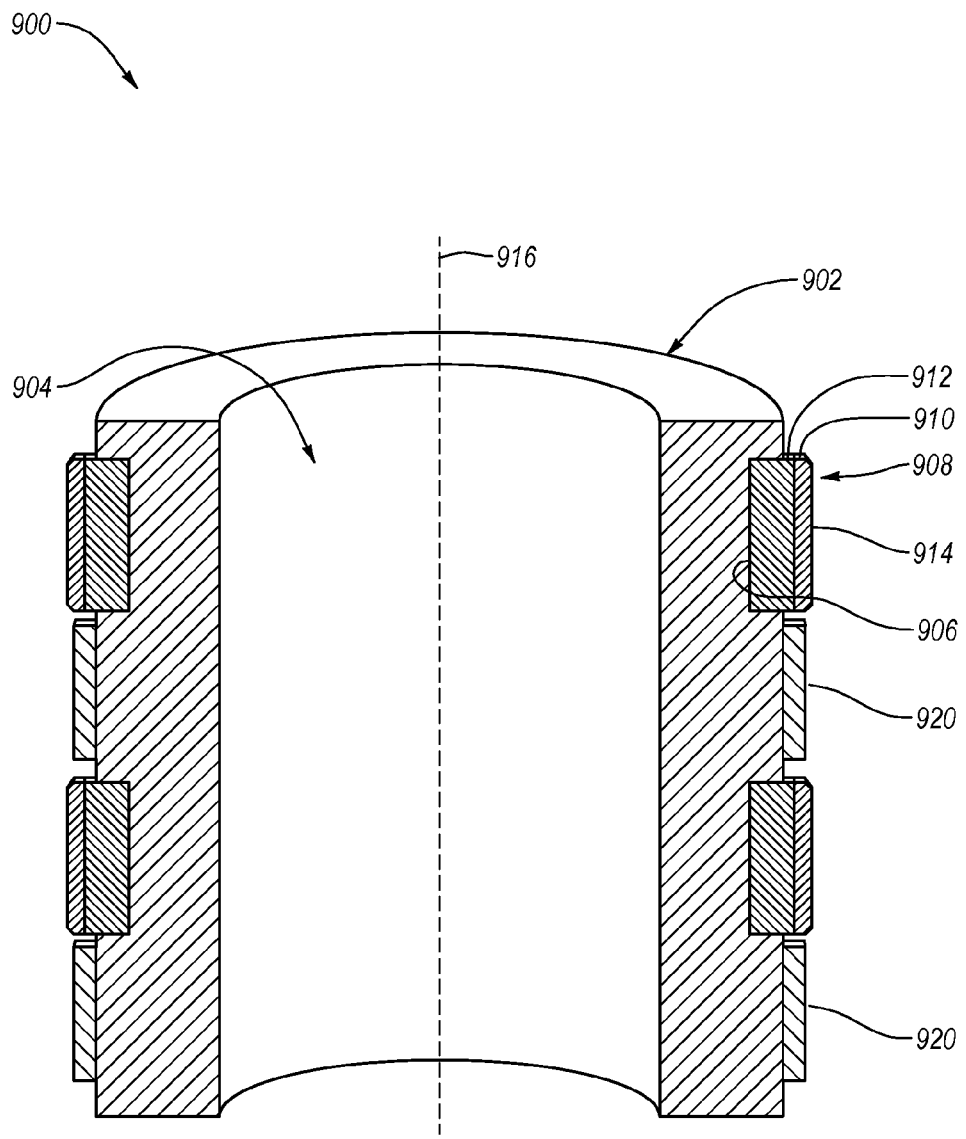
FIG. 9B is a cross-sectional view of the radial bearing assembly shown in FIG. 9A taken along line 9B-9B.

The concepts used in the thrust-bearing assemblies and apparatuses described above may also be employed in radial bearing assemblies and apparatuses. FIGS. 9A and 9B are isometric and isometric cutaway views, respectively, illustrating a radial bearing assembly 900 according to an embodiment. The radial bearing assembly 900 may include a support ring 902 extending about a rotation axis 916. The support ring 902 may define a central opening 904 and may include a plurality of superhard bearing elements 908 distributed circumferentially about the rotation axis 916. Each superhard bearing element 908 may include a superhard table 910 including a convexly-curved bearing surface 914 (e.g., curved to lie on an imaginary cylindrical surface). Each superhard table 910 may be bonded or attached to a corresponding substrate 912. The superhard bearing elements 908 may have a generally oval-like shape and each may be made from any of the materials discussed above for the superhard bearing elements 108. In other embodiments, the superhard bearing elements 908 may have a non-cylindrical shape, a generally wedge-like shape, a generally cylindrical shape, or any other suitable shape. The superhard bearing elements 908 may be circumferentially distributed in corresponding recesses 906 (shown in FIG. 9B) formed in the support ring 902 and arranged in two rows. In other embodiments, the superhard bearing elements 908 may be circumferentially distributed in one row, three rows, four rows, or any number of rows.

In an embodiment, the radial bearing assembly 900 may include cooling features configured to improve heat removal and/or lubrication of the radial bearing assembly 900. For example, the cooling features may be configured to influence flow of the lubricating fluid over the top and/or around the support ring 902 and/or the superhard bearing elements 908 by directing and/or capturing the lubricating fluid. In other embodiments, the cooling features may be configured to improve heat dissipation during operation of the radial bearing assembly 900 by mixing and/or creating additional surface area on the support ring 902 in contact with the lubricating fluid.

In an embodiment, the cooling features may be configured as a plurality of fins 920 extending radially from the support ring 902. The fins 920 may be formed in any suitable manner, and no particular method for forming the fins 920 is to be considered limiting. For example, the fins 920 may be formed of carbon steel, stainless steel, tungsten carbide, ceramic materials, composites, combinations thereof, or other suitably abrasion resistant material. In other embodiments, the fins 920 may be formed integrally with the support ring 902 (i.e., by machining the fins 920 and the support ring 902 from a single piece of material). In other embodiments, the fins 920 may be secured to the support ring 902 via brazing, welding, fastening with one or more fasteners, or another suitable technique. In other embodiments, the fins 920 may be secured to the support ring 902 such that the lubricating fluid may flow over, under, through and/or around the fins 920.

In an embodiment, the fins 920 may be arranged in a first row and a second row on the support ring 902. At least some of the fins 920 may extend along a path substantially parallel to the rotation axis 916. The first row of fins 920 is illustrated above the second row of superhard bearing elements 908 and the second row of fins 920 is illustrated below the second row of superhard bearing elements 908. In an embodiment, the fins 920 may be configured and positioned to influence the velocity of the lubricating fluid and/or the superhard bearing elements 908. For example, the fins 920 may be configured to move or push the lubricating fluid in a desired direction. The fins 920 may also be configured and positioned to help capture the lubricating fluid flowing through the radial bearing assembly 900. For example, the fins 920 may be configured to sweep lubricating fluid flowing generally parallel to the rotation axis 916 over the support ring 902 and/or the superhard bearing elements 908. Optionally, the fins 920 may further be configured to mix the lubricating fluid to help break-up solids having the potential to interfere with the flow of the lubricating fluid through the radial bearing assembly 900.

The fins 920 may have varying configurations and/or shapes. The fins 920 may have generally rectangular shaped bodies, generally s-shaped bodies, generally arcuate bodies, combinations thereof, or other suitable shapes. For example, the first row of fins 920 may have generally s-shaped bodies while the second row of fins 920 may have generally arcuate shaped bodies. In other embodiments, at least some of the first row of fins 920 may have arcuate shaped bodies and at least some of the first row of fins 920 may have rectangular shaped bodies. Depending on anticipated flow conditions at specific locations within the radial bearing apparatus 900, appropriate configurations and/or shapes of the fins 920 may be selected.

In an embodiment, the multi-row arrangement of the fins 920 may allow the fins 920 to direct lubricating fluid through the radial bearing assembly 900 onto the bearing surfaces 914 in either or both the illustrated first and second rows of superhard bearing elements 908. As shown in FIG. 9A, the fins 920 may be positioned such that the fins are generally parallel the rotation axis 916. In addition, at least a portion of the fins 920 may include surface features, flow features, edge features, or combinations thereof such that turbulent flow may be encouraged to mix the lubricating fluid. Mixing the lubricating fluid may also help prevent solids suspended in the lubricating fluid from clogging up the radial bearing assembly 900 during operation. Further, mixing up the lubricating fluid may help remove heat from the radial bearing assembly 900 by increasing convection heat transfer from the support ring 902 and/or the superhard bearing elements 908.

Figure 10A:
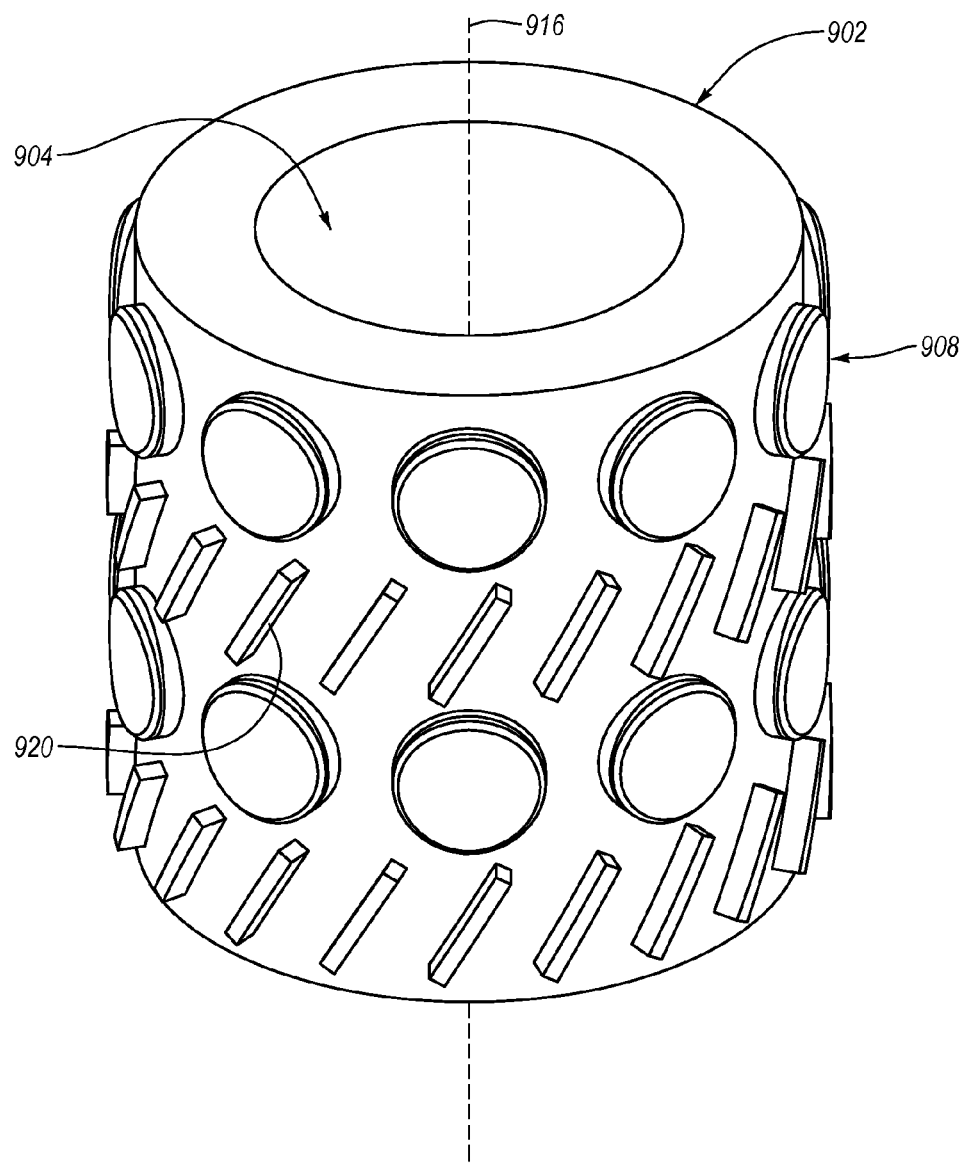
FIG. 10A is an isometric view of a radial bearing assembly according to an embodiment.
Figure 10B:
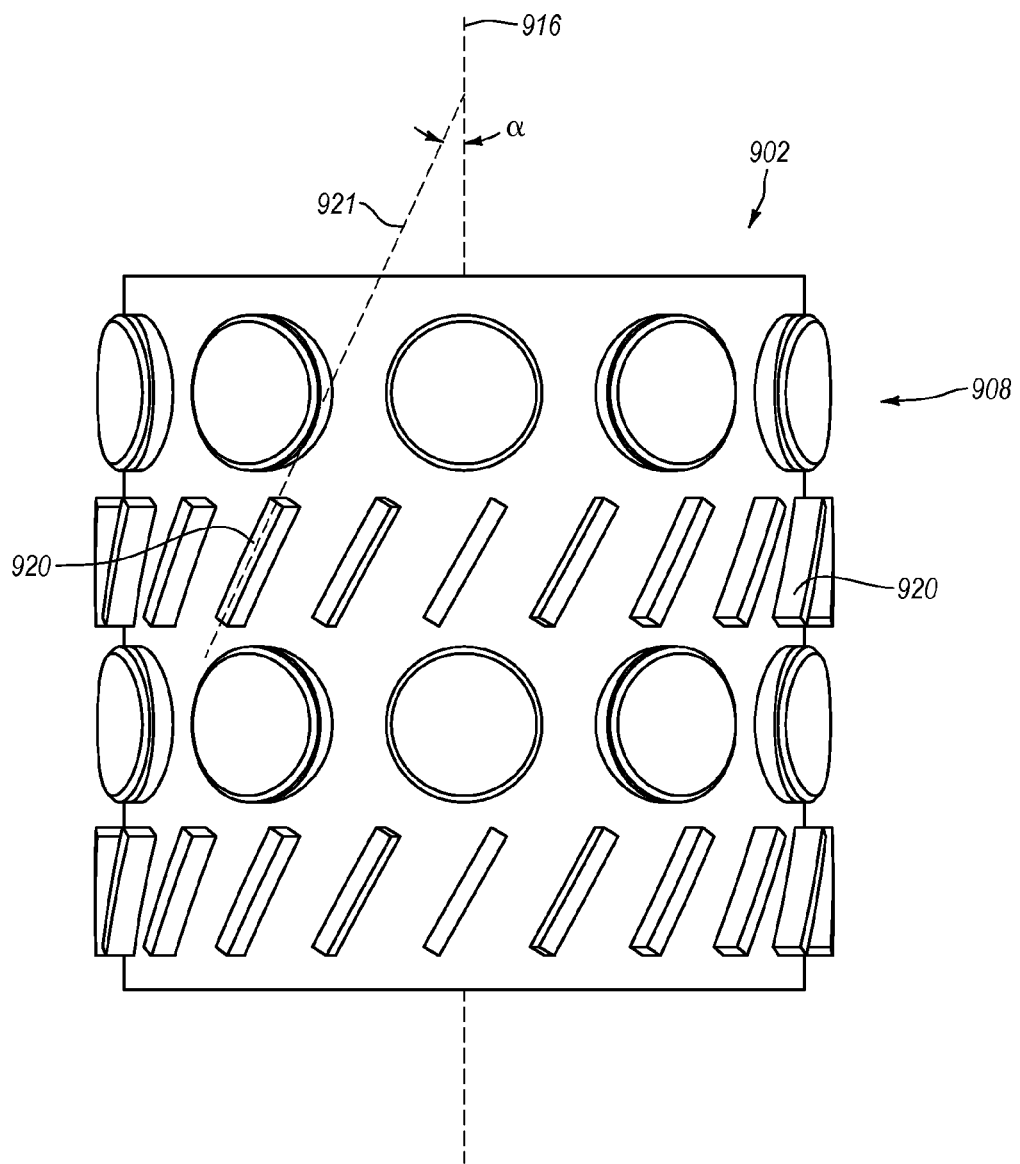
FIG. 10B is a side view of the radial bearing assembly shown in FIG. 10A.

The orientation of the fins 920 on the support ring 902 may also be adapted to have any of a variety of configurations. For example, in an embodiment, the fins 920 may be obliquely oriented on the support ring 902 as shown in FIGS. 10A and 10B. Each fin 920 may extend along a substantially straight reference path 921 that forms an oblique angle α relative to the rotation axis 916 as shown in FIG. 10B. The angle α may be configured to capture the lubricating fluid flowing around the support ring 902 and/or direct fluid flow over the top and/or around the support ring 902 and/or the superhard bearing elements 908. In an embodiment, the angle α may be about one (1) degree to eighty nine (89) degrees; about five (5) degrees to eighty five (85) degrees; or about twenty (20) degrees to seventy (70) degrees. In yet other embodiments, the support ring 902 may include both straight fins 920 and oblique fins 920. For example, the support ring 902 may include a pair of straight fins 920 followed by three oblique fins 920, followed by another pair of straight fins 920.

Figure 11A:
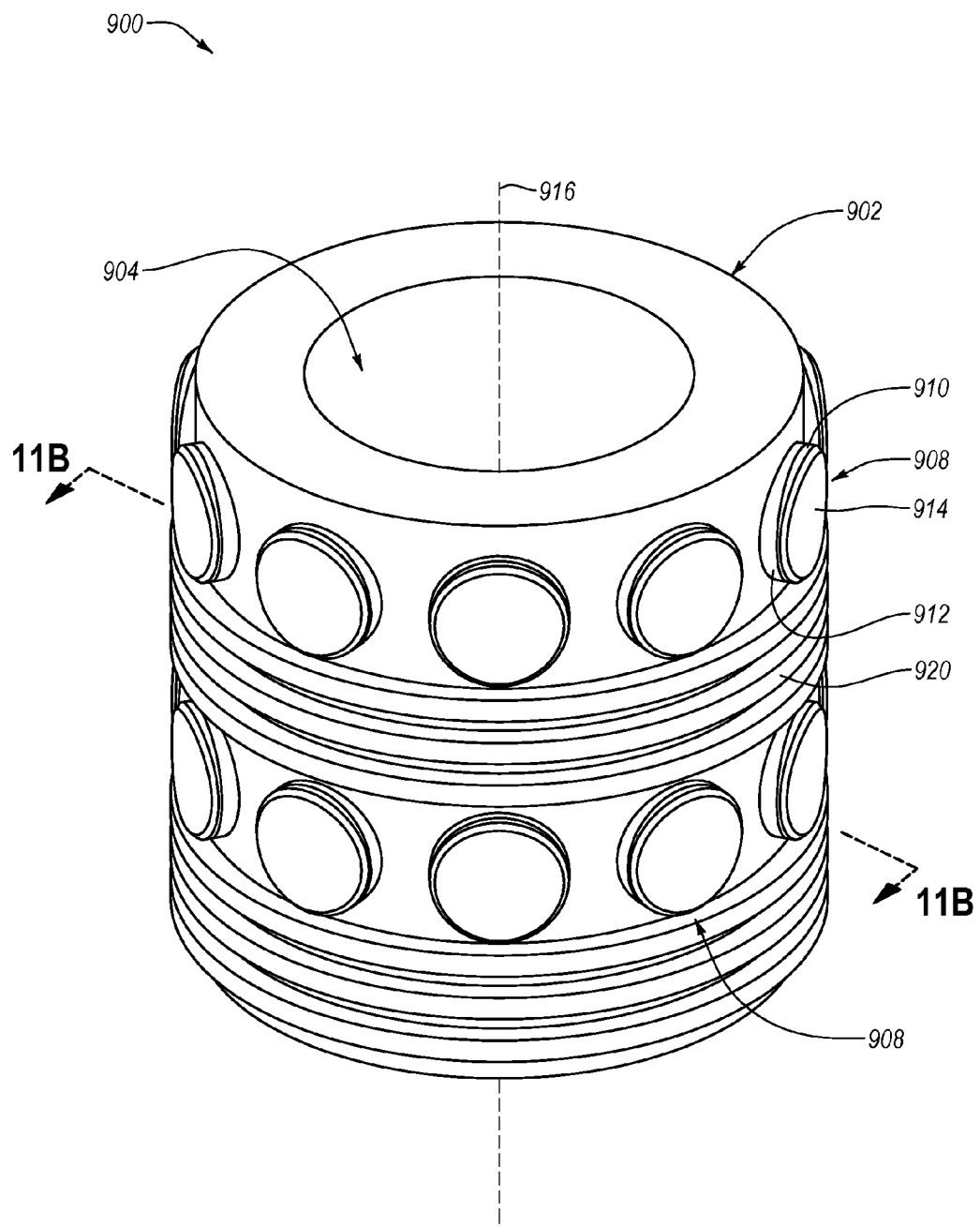
FIG. 11A is an isometric view of a radial bearing assembly according to an embodiment.
Figure 11B:
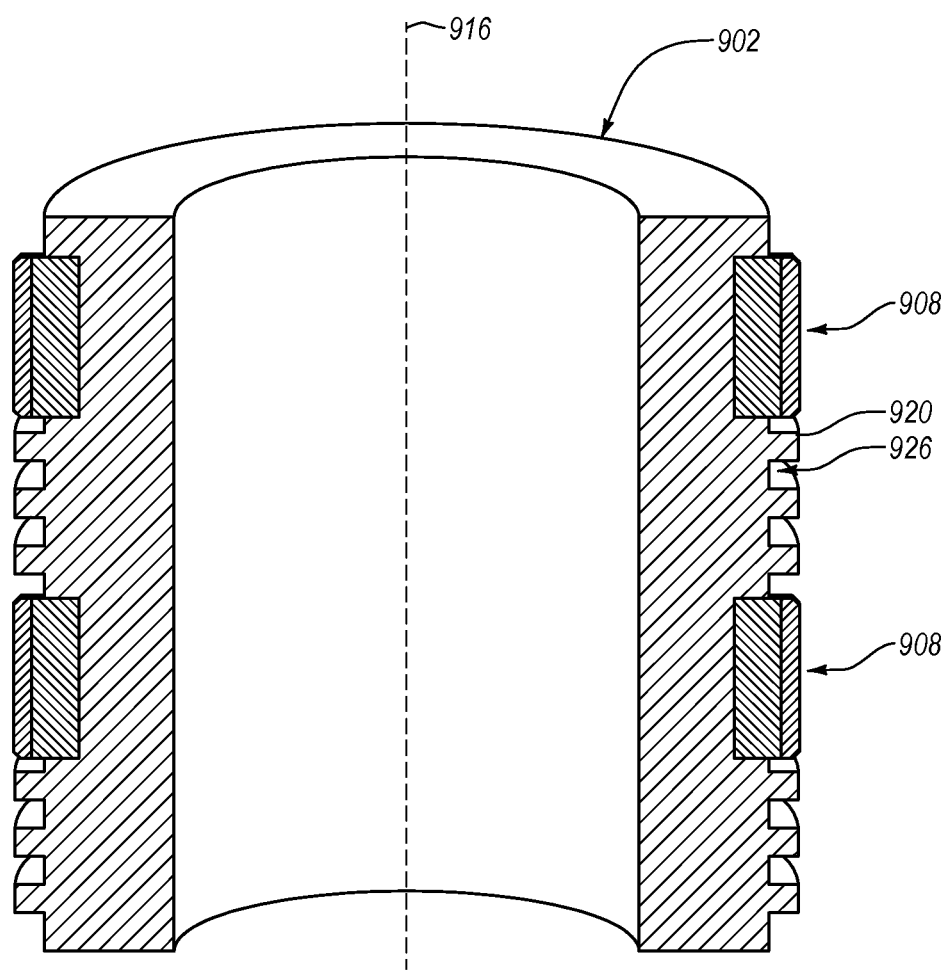
FIG. 11B is a cross-sectional view of the radial bearing assembly shown in FIG. 11A taken along line 11B-11B.

In an embodiment, the fins 920 may be configured to extend about the rotation axis 916 along a ring-like path as shown in FIGS. 11A and 11B. In an embodiment, the fins 920 may be arranged in a first grouping and a second grouping on the support ring 902. The first grouping of fins 920 is illustrated above the second row of superhard bearing elements 908 and the second grouping of fins 920 is illustrated below the second row of superhard bearing elements 908. In other embodiments, the fins 920 may be arranged in a single grouping, three groupings, no groupings, or other suitable groupings.

In other embodiments, one or more fins 920 may extend about the rotation axis 916 along a helical-like path, a spiral-like path, a sinusoidal-like path, an irregular path, combinations thereof, or other suitable path configurations. Each of the fins 920 may be generally parallel or generally non-parallel to one another. The fins 920 may be generally continuous or generally non-continuous.

As shown in FIG. 11B, gaps 926 may be formed between the fins 920. The gaps 926 may have a generally rectangular cross-section. In other embodiments, the gaps 926 may have a generally parabolic shaped cross-section, a generally trapezoidal cross-section, combinations thereof, or other suitable cross-sectional shapes. The cross-sectional shape of the gaps 926 may vary or may be continuous.

The cooling features may also be adapted to have any of a variety of other configurations. For example, in an embodiment, the cooling features may be configured as a plurality of grooves 924 formed in the support ring 902. The grooves 924 may be formed in any suitable manner, and no particular method for forming the grooves 924 is to be considered limiting. For example, the grooves 924 may be formed by EDM, laser-cutting, machining processes, casting, powder metallurgy, spark machining, or otherwise forming the grooves 924 in the support ring 902.

Figure 12A:
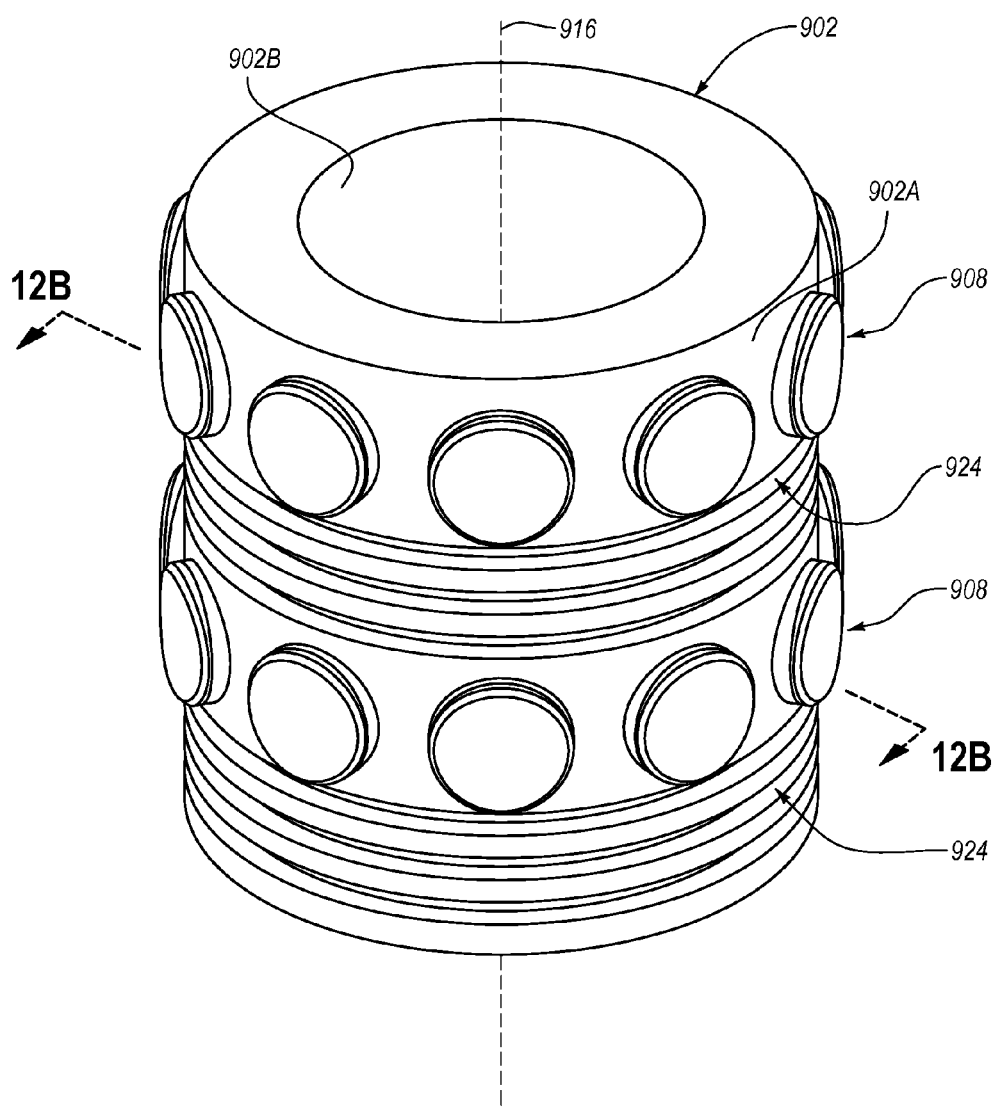
FIG. 12A is an isometric view of a radial bearing assembly according to an embodiment.
Figure 12B:
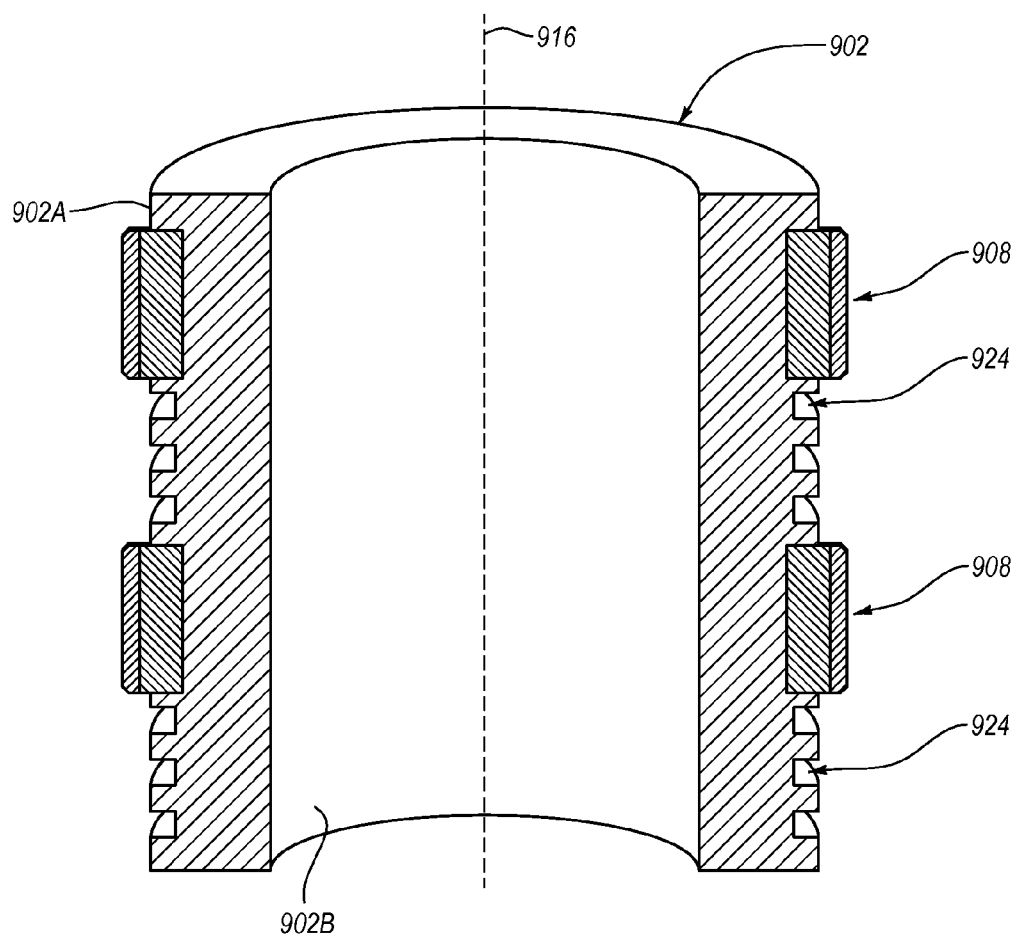
FIG. 12B is a cross-sectional view of the radial bearing assembly shown in FIG. 12A taken along line 12B-12B.

As shown in FIGS. 12A and 12B, the grooves 924 may extend about the rotation axis 916 along a ring-like path formed in the outer surface 902A of the support ring 902. In an embodiment, the grooves 924 may be arranged in a first grouping and a second grouping on the support ring 902. The first grouping of grooves 924 is illustrated above the second row of superhard bearing elements 908 and the second grouping of grooves 924 is illustrated below the second row of superhard bearing elements 908. In other embodiments, the grooves 924 may be arranged in a single grouping, three groupings, no groupings, or other suitable groupings.

In other embodiments, one or more of the grooves 924 may extend about the rotation axis 916 along a helical-like path, a spiral-like path, a sinusoidal-like path, an irregular path, combinations thereof, or other suitable path configurations. The grooves 924 may be formed in any surface on the support ring 902, including without limitation, the outer surface 902A and/or the inner surface 902B. The grooves 924 may be generally parallel, generally non-parallel, uniform, non-uniform, combinations thereof, or the like. In addition, the grooves 924 may have a generally rectangular cross-section, a generally v-shaped cross-section, a generally u-shaped cross-section, a generally trapezoidal cross-section, combinations thereof, or other suitable cross-sectional shapes. Similar to the grooves 124 described in relation to FIGS. 6A and 6B, at least one of the grooves 924 may have a width W and a depth D that can be varied to influence flow conditions and/or heat dissipation. For example, the width W and the depth D of at least some of the grooves 924 may be selected to effectively increase the surface area of the support ring 902 in contact with the lubricating fluid. In addition, the grooves 924 may help direct the flow of the lubricating fluid around and/or over the support ring 902 and/or the superhard bearing elements 908.

Figure 13A:
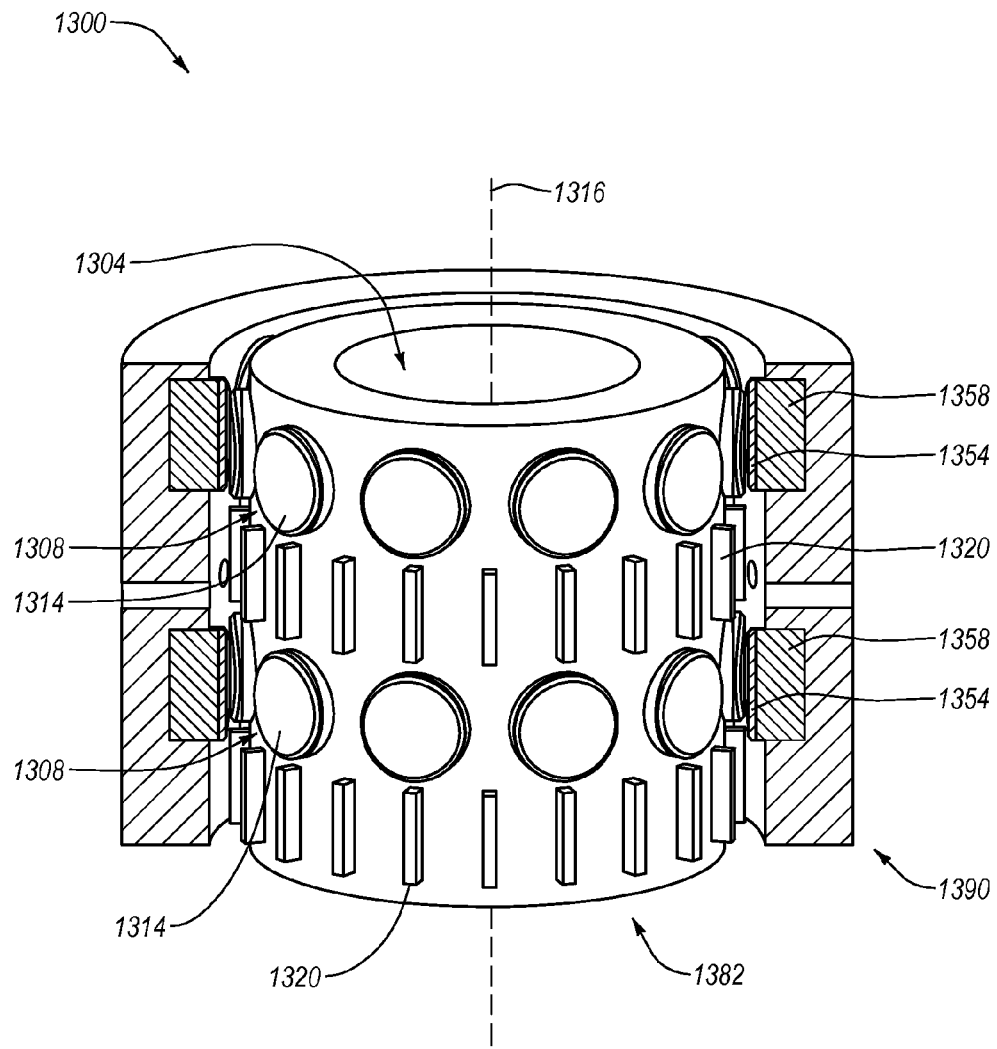
FIG. 13A is a partial isometric cutaway view of a radial bearing apparatus that may employ any of the disclosed radial bearing assemblies according to an embodiment.

FIG. 13A is a partial cutaway view of a radial bearing apparatus 1300 according to an embodiment. The radial bearing apparatus 1300 may include an inner race 1382 (e.g., a rotor). The inner race 1382 may define an opening 1304 and may include a plurality of circumferentially-adjacent superhard bearing elements 1308, each of which includes a convexly-curved bearing surface 1314. The superhard bearing elements 1308 may be distributed circumferentially about a rotation axis 1316 in corresponding recesses (not shown) formed in the inner race 1382 and arranged in two rows. In other embodiments, the superhard bearing elements 1308 may be arranged in one, three, four, or any other number of suitable rows. The inner race 1382 may also include one or more cooling features comprising a plurality of fins 1320 arranged and configured similar to the fins 920 described in relation to FIG. 9A. In other embodiments, the inner race 1382 may include at least one of any of the cooling features described in relation to FIGS. 1A through 12B. For example, the inner race 1382 may include baffles similar to the baffles 122 described in relation to FIG. 5 and/or grooves similar to the grooves 924 described in relation to FIGS. 12A and 12B.

The radial bearing apparatus 1300 may further include an outer race 1390 (i.e., a stator) that extends about and receives the inner race 1382. The outer race 1390 may include a plurality of circumferentially-distributed superhard bearing elements 1358, each of which includes a concavely-curved bearing surface 1354 curved to correspond to the convexly-curved bearing surfaces 1314. The superhard bearing elements 1358 and 1308 may each be made from any of the materials discussed above for the superhard bearing elements 108. In other embodiments, the outer race 1390 may also include a plurality of fluid conduits (not shown) through which lubricating/drilling fluid may enter or exit the radial bearing apparatus 1300 during operation. The terms "rotor" and "stator" refer to rotating and stationary components of the radial bearing apparatus 1300, respectively. Thus, if the outer race 1390 is configured to remain stationary, the outer race 1390 may be referred to as the stator and the inner race 1382 may be referred to as the rotor.

The radial bearing apparatus 1300 may be employed in a variety of mechanical applications. For example, so-called "rotary cone" rotary drill bits, pumps, or turbines may benefit from a radial bearing apparatus disclosed herein, or rotary steerable drilling systems.

Figure 13B:
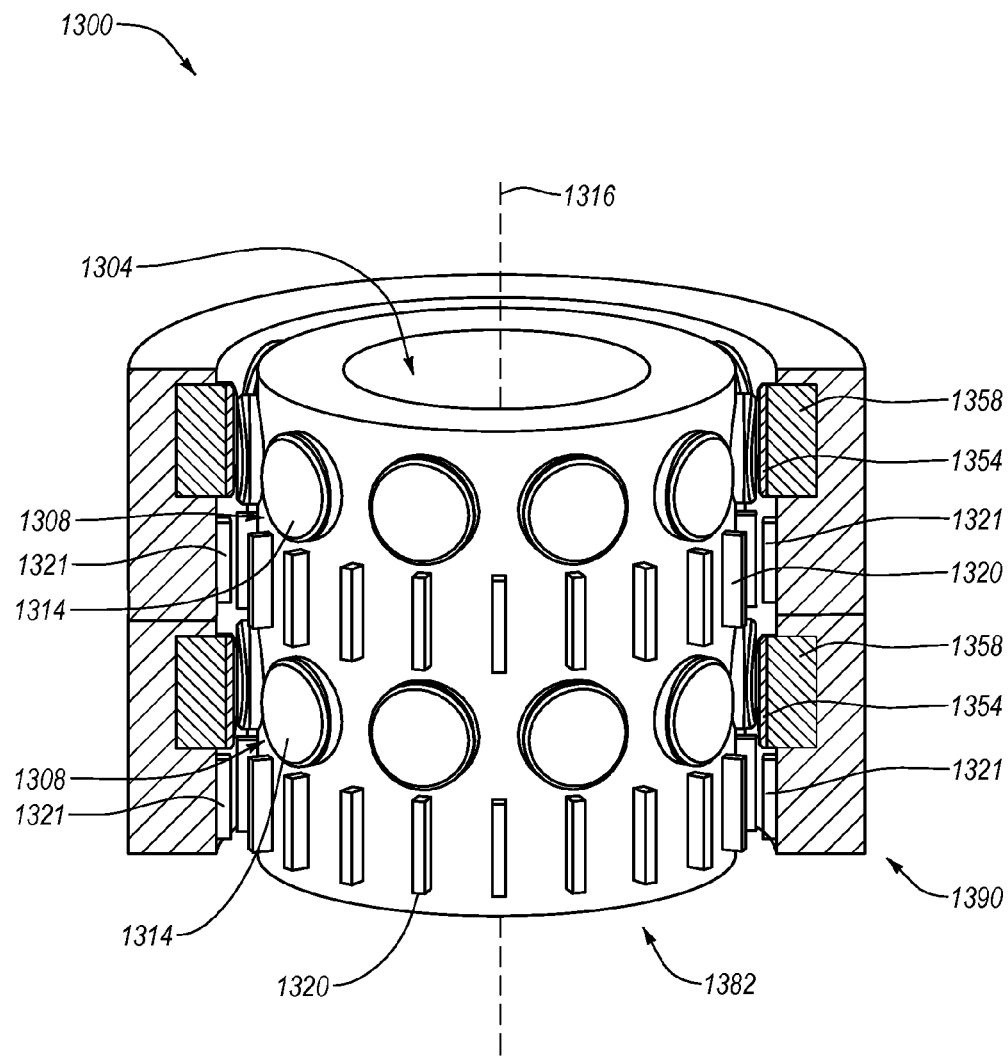
FIG. 13B is a partial isometric cutaway view of a radial bearing apparatus that may employ any of the disclosed radial bearing assemblies according to another embodiment.

It is noted that the outer race 1390 of the radial bearing apparatus 1300 is shown not including cooling features. However, in other embodiments, the outer race 1390 may also include at least one cooling feature as shown in FIG. 13B. For example, the at least one cooling feature may comprise one or more fins 1321 positioned between the superhard bearing elements 1358 of the outer race 1390. In one embodiment, the one or more fins 1321 may be configured to help direct lubricating fluid over and/or around the inner race 1382 and/or the outer race 1390 during operation. While one or more fins 1321 are shown, in other embodiments the outer race 1390 may include at least one cooling feature comprising one or more grooves, one or more baffles, or any other suitable cooling features. Generally, the outer race 1390, the inner race 1382, or both may include at least one cooling feature in the radial bearing apparatus 1390.

Referring again to FIG. 13A, in operation, rotation of the shaft sections (not shown) secured to the rotor 1382 may affect rotation of the rotor 1382 relative to the stator 1390. Lubricating fluid may be pumped through the radial bearing apparatus 1300. Optionally, the fins 1320 on the rotor 1382 may help direct the lubricating fluid over and/or around the rotor 1382, the stator 1390, the superhard bearing elements 1308, and/or the superhard bearing elements 1358. Moreover, under certain operational conditions and at sufficient rotational speeds for the rotor 1382, a fluid film may develop between the bearing surfaces 1314 of the superhard bearing elements 1308 and the bearing surfaces 1354 of the superhard bearing elements 1358 to maintain the bearing surfaces 1314 and the bearing surfaces 1354 apart from each other. Accordingly, wear on the superhard bearing elements 1308 and the superhard bearing elements 1358 may be reduced. In addition, the fins 1320 may help heat removal from the rotor 1382. Further, optionally, the fins 1320 may help mix the lubricating fluid to reduce clogging between the stator 1382 and the rotor 1390.

Figure 14:
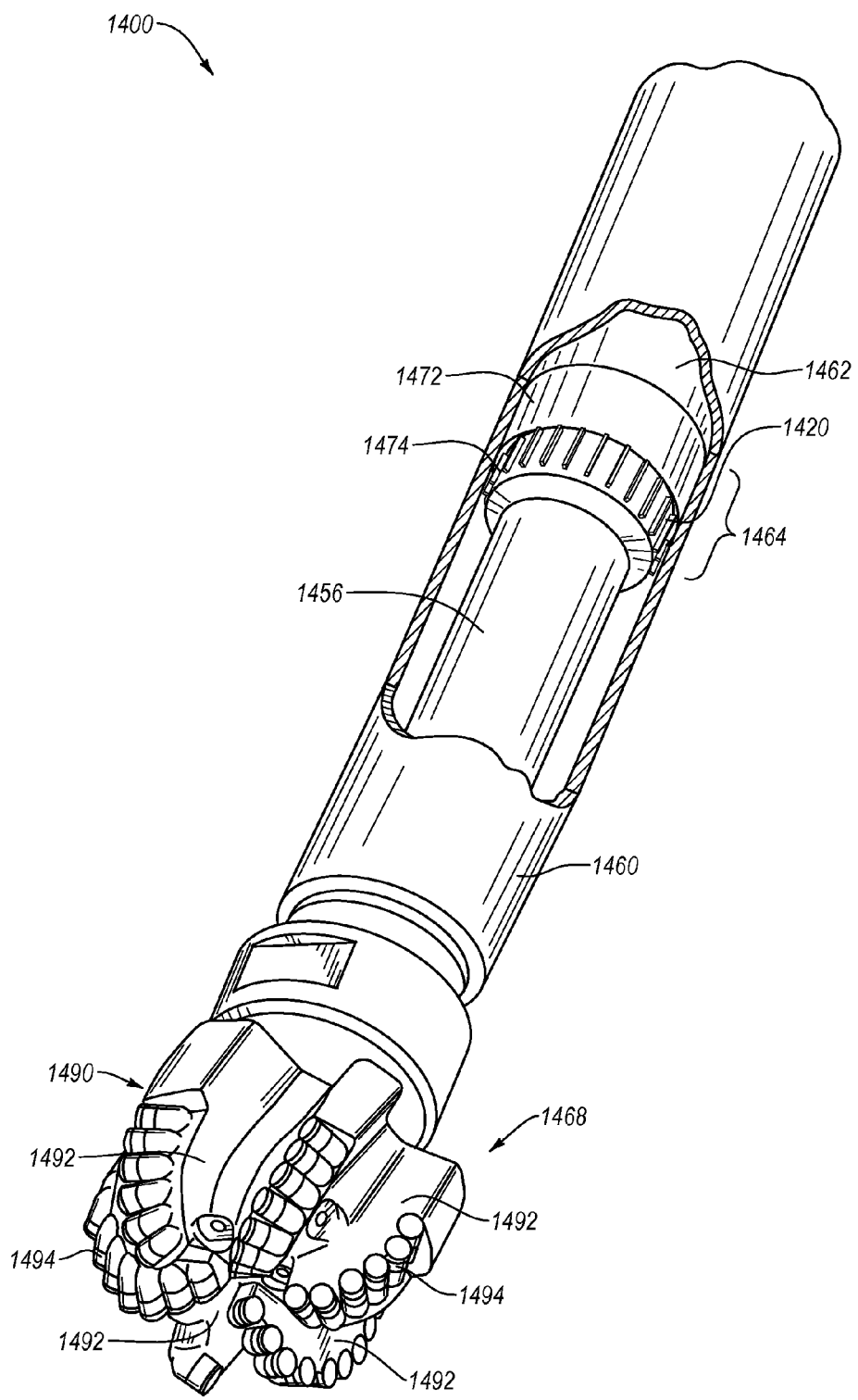
FIG. 14 is a schematic isometric cutaway view of a subterranean drilling system including a thrust-bearing apparatus utilizing any of the previously described bearing assemblies according to various embodiments.

Any of the embodiments for bearing apparatuses discussed above may be used in a subterranean drilling system. FIG. 14 is a schematic isometric cutaway view of a subterranean drilling system 1400 according to an embodiment. The subterranean drilling system 1400 may include a housing 1460 enclosing a downhole drilling motor 1462 (i.e., a motor, turbine, or any other device capable of rotating an output shaft) that may be operably connected to an output shaft 1456. A thrust-bearing apparatus 1464 may be operably coupled to the downhole drilling motor 1462. The thrust-bearing apparatus 1464 may be configured as any of the previously described thrust-bearing apparatus embodiments. A rotary drill bit 1468 may be configured to engage a subterranean formation and drill a borehole and may be connected to the output shaft 1456. The rotary drill bit 1468 is shown as a fixed cutter drill bit including a bit body 1490 having radially-extending and longitudinally-extending blades 1492 with a plurality of PDCs 1494 secured to the blades 1492. However, other embodiments may utilize different types of rotary drill bits, such as core bits and/or roller-cone bits. As the borehole is drilled, pipe sections may be connected to the subterranean drilling system 1400 to form a drill string capable of progressively drilling the borehole to a greater depth within the earth.

The thrust-bearing apparatus 1464 may include a stator 1472 that does not rotate and a rotor 1474 that may be attached to the output shaft 1456 and rotates with the output shaft 1456. As discussed above, the thrust-bearing apparatus 1464 may be configured as any of the embodiments disclosed herein. For example, the stator 1472 may include a plurality of circumferentially-distributed superhard bearing elements (not shown) similar to those shown and described in the thrust-bearing assembly 100 of FIG. 1A. The rotor 1474 may include a plurality of circumferentially-distributed superhard bearing elements (not shown) and cooling features 1420 such as those fins shown and described in the thrust-bearing assembly 100 of FIG. 1A.

In operation, lubricating fluid may be circulated through the downhole drilling motor 1462 to generate torque and rotate the output shaft 1456 and the rotary drill bit 1468 attached thereto so that a borehole may be drilled. A portion of the lubricating fluid may also be used to lubricate opposing bearing surfaces of the stator 1472 and the rotor 1474. When the rotor 1474 is rotated, the cooling features 1420 of the rotor 1474 may direct the lubricating fluid onto the bearing surfaces of the stator 1472 and the rotor 1474, as previously discussed. The cooling features 1420 of the rotor 1474 may also direct the lubricating fluid over and/or around the rotor 1474 and/or the stator 1472. In addition, the cooling features 1420 of the rotor 1474 may increase heat dissipation from the thrust-bearing apparatus 1464.

Although the bearing assemblies and apparatuses described above have been discussed in the context of subterranean drilling systems and applications, in other embodiments, the bearing assemblies and apparatuses disclosed herein are not limited to such use and may be used for many different applications, if desired, without limitation. Thus, such bearing assemblies and apparatuses are not limited for use with subterranean drilling systems and may be used with various mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A bearing assembly, comprising:
   a plurality of superhard bearing elements distributed circumferentially about an axis, each of the plurality of superhard bearing elements having a bearing surface;
   a support ring extending about the axis, the support ring carrying the plurality of superhard bearing elements, the support ring including at least one outer surface;
   a plurality of cooling features projecting outwardly from the at least one outer surface of the support ring.

2. The bearing assembly of claim 1 wherein the plurality of cooling features include a plurality of fins defining a plurality of grooves formed in the at least one outer surface of the support ring.

3. The bearing assembly of claim 2 wherein the plurality of grooves extend axially.

4. The bearing assembly of claim 2 wherein the plurality of grooves extend circumferentially.

5. The bearing assembly of claim 2 wherein the plurality of grooves are spaced circumferentially.

6. The bearing assembly of claim 2 wherein the plurality of grooves are spaced axially.

7. The bearing assembly of claim 2 wherein at least some of the plurality of grooves exhibit a depth of about 0.1 inch to about 0.4 inch, and a width of about 0.1 inch to about 0.5 inch.

8. The bearing assembly of claim 1 wherein the plurality of cooling features include a plurality of fins projecting outwardly from the at least one outer surface.

9. The bearing assembly of claim 8 wherein the plurality of fins extend along a ring-shaped path, a generally sinusoidal path, a straight path, or a generally helical path.

10. The bearing assembly of claim 8 wherein the plurality of fins extend at least partially between the upper and lower surfaces of the support ring.

11. The bearing assembly of claim 8 wherein the plurality of fins include a generally rectangular body, a generally s-shaped body, or a generally arcuate body.

12. The bearing assembly of claim 1 wherein the at least one outer surface includes an upper surface, and the plurality of cooling features project outwardly from the upper surface.

13. The bearing assembly of claim 1 wherein the at least one outer surface includes a radial inner surface and a radial outer surface, and the plurality of cooling features project outwardly from at least one of the radial inner surface or the radial outer surface.

14. The bearing assembly of claim 1 wherein at least some of the plurality of cooling features are formed integrally with the support ring.

15. The bearing assembly of claim 1 wherein at least some of the plurality of cooling features are brazed to the support ring, interference-fitted to the support ring, or fastened to the support ring.

16. The bearing assembly of claim 1 wherein the plurality of cooling features are configured to promote cooling of the support ring in contact with lubricating fluid during operation of the bearing assembly.

17. The bearing assembly of claim 1 wherein each of the plurality of superhard bearing elements include a polycrystalline diamond compact.

18. The bearing assembly of claim 1 wherein the plurality of superhard bearing elements, the support ring, and the plurality of cooling features define a thrust-bearing assembly or a radial bearing assembly.

19. The bearing assembly of claim 1 wherein the plurality of cooling features exhibit a geometry and a surface area selected to increase cooling of the support ring in contact with lubricating fluid during operation of the bearing assembly.

20. A bearing assembly, comprising:
a plurality of polycrystalline diamond bearing elements distributed circumferentially about an axis, each of the plurality of polycrystalline diamond bearing elements having a bearing surface;
a support ring extending about the axis, the support ring carrying the plurality of polycrystalline diamond bearing elements, the support ring including at least one outer surface;
a plurality of cooling features projecting outwardly from the at least one outer surface of the support ring, the plurality of cooling features exhibit a geometry and a surface area selected to promote cooling of the support ring in contact with lubricating fluid during operation of the bearing assembly.

21. The bearing assembly of claim 20 wherein the plurality of cooling features include a plurality of fins or a plurality of baffles.

22. A bearing apparatus, comprising:
a first bearing assembly including:
a first plurality of superhard bearing elements distributed circumferentially about an axis, each of the first plurality of superhard bearing elements having a first bearing surface;
a first support ring extending about the axis, the first support ring carrying the first plurality of superhard bearing elements, the first support ring including at least one outer surface;
a plurality of cooling features projecting outwardly from the at least one outer surface of the first support ring; and
a second bearing assembly including:
a second at least one superhard bearing element generally opposed to the first plurality of superhard bearing elements of the first bearing assembly; and
a second support ring that carries the second at least one superhard bearing element.

23. The bearing apparatus of claim 22 wherein the first bearing assembly is configured as a rotor, and the second bearing assembly is configured as a stator.

24. The bearing apparatus of claim 22 wherein the first bearing assembly and the second bearing assembly define a thrust-bearing assembly.

25. The bearing apparatus of claim 22 wherein the first bearing assembly and the second bearing assembly define a radial bearing assembly.

26. The bearing apparatus of claim 22 wherein the second at least one superhard bearing element includes a second plurality of superhard bearing elements.

\* \* \* \* \*